(12) United States Patent
Hartmann et al.

(10) Patent No.: US 9,371,400 B2
(45) Date of Patent: *Jun. 21, 2016

(54) THERMAL REGULATING BUILDING MATERIALS AND OTHER CONSTRUCTION COMPONENTS CONTAINING PHASE CHANGE MATERIALS

(75) Inventors: Mark Hartmann, Boulder, CO (US); Greg Roda, Broomfield, CO (US); Aharon Eyal, Jerusalem (IL)

(73) Assignee: OUTLAST TECHNOLOGIES, LLC, Golden, CO (US)

( * ) Notice: Subject to any disclaimer, the term of this patent is extended or adjusted under 35 U.S.C. 154(b) by 198 days.

This patent is subject to a terminal disclaimer.

(21) Appl. No.: 13/525,676

(22) Filed: Jun. 18, 2012

(65) Prior Publication Data

US 2013/0040526 A1 Feb. 14, 2013

Related U.S. Application Data

(63) Continuation of application No. 12/762,119, filed on Apr. 16, 2010, now Pat. No. 8,221,910.

(51) Int. Cl.
*C08B 15/02* (2006.01)
*C08F 120/32* (2006.01)
(Continued)

(52) U.S. Cl.
CPC .............. *C08B 15/02* (2013.01); *C08F 120/32* (2013.01); *C08F 220/18* (2013.01); *D01F 1/10* (2013.01);
(Continued)

(58) Field of Classification Search
USPC .................. 442/136; 428/913, 402.2, 402.21, 428/402.24; 252/67
See application file for complete search history.

(56) References Cited

U.S. PATENT DOCUMENTS 3,926,899 A 12/1975 Nordberg
4,154,462 A 5/1979 Golden et al.
(Continued)

FOREIGN PATENT DOCUMENTS

CN 1317602 C 10/2001
CN 1446120 A 10/2003
(Continued)

OTHER PUBLICATIONS

Watson, M.D., et al., "Ethylene/Vinyl Acetate Copolymers via Acyclic Diene Metathesis Polymerization. Examining the Effect of 'Long' Precise", "Macromolecules", Jun. 24, 2000, pp. 5411-5417, vol. 33, No. 15, Publisher: Am. Chem. Soc'y, Published in: US.

(Continued)

*Primary Examiner* — Lynda Salvatore
(74) *Attorney, Agent, or Firm* — Neugeboren O'Dowd PC

(57) ABSTRACT

A material for energy management and peak energy reduction in a building structure, comprises an insulative base material, a first phase change material, and a functional polymeric phase change material that dynamically absorbs and releases heat to adjust heat transfer. The functional polymeric phase change material has at least one phase change temperature in the range between −10° C. and 100° C. and a phase change enthalpy of at least 5 Joules per gram, the functional polymeric phase change material including a plurality of polymer chains that include a backbone chain and a plurality of side chains, wherein a first portion of the plurality of polymer chains are crosslinked to each other, wherein a second portion of the plurality of polymer chains are crosslinked with the first phase change material and a third portion of the plurality of side chains are mechanically entangled with the inorganic insulative base material.

18 Claims, 22 Drawing Sheets

(51) Int. Cl.
    *C08F 220/18* (2006.01)
    *D01F 1/10* (2006.01)
    *D06M 15/263* (2006.01)
    *D06M 15/273* (2006.01)
    *D21B 1/10* (2006.01)

(52) U.S. Cl.
    CPC .......... *D06M 15/263* (2013.01); *D06M 15/273* (2013.01); *D21B 1/10* (2013.01); *C08F 2220/1891* (2013.01); *Y02W 30/644* (2015.05); *Y10S 428/913* (2013.01); *Y10T 428/3188* (2015.04); *Y10T 442/696* (2015.04)

(56) References Cited

U.S. PATENT DOCUMENTS

| | | |
|---|---|---|
| 4,181,643 A | 1/1980 | Kreibich et al. |
| 4,259,198 A | 3/1981 | Kreibich et al. |
| 4,505,953 A | 3/1985 | Chen et al. |
| 4,708,812 A | 11/1987 | Hatfield |
| 4,756,958 A | 7/1988 | Bryant et al. |
| 4,851,291 A | 7/1989 | Vigo et al. |
| 4,871,615 A | 10/1989 | Vigo et al. |
| 4,908,238 A | 3/1990 | Vigo et al. |
| 5,120,349 A | 6/1992 | Stewart et al. |
| 5,156,911 A | 10/1992 | Stewart |
| 5,254,354 A | 10/1993 | Stewart |
| 5,254,380 A | 10/1993 | Salyer |
| 5,366,801 A | 11/1994 | Bryant et al. |
| 5,432,210 A | 7/1995 | Bogan |
| 5,433,953 A | 7/1995 | Tsuei et al. |
| 5,589,194 A | 12/1996 | Tsuei et al. |
| 5,718,835 A | 2/1998 | Momose et al. |
| 5,804,297 A | 9/1998 | Colvin et al. |
| 5,814,407 A | 9/1998 | Richard et al. |
| 5,866,663 A | 2/1999 | Brookhart et al. |
| 5,885,475 A | 3/1999 | Salyer |
| 5,897,952 A | 4/1999 | Vigo et al. |
| 5,969,070 A | 10/1999 | Waymouth et al. |
| 5,985,309 A | 11/1999 | Edwards et al. |
| 6,004,662 A | 12/1999 | Buckley |
| 6,015,570 A | 1/2000 | Tucci et al. |
| 6,025,287 A | 2/2000 | Hermann |
| 6,063,312 A | 5/2000 | Mannheimer |
| 6,207,738 B1 | 3/2001 | Zuckerman et al. |
| 6,319,599 B1 | 11/2001 | Buckley |
| 6,379,753 B1 | 4/2002 | Soane et al. |
| 6,380,336 B1 | 4/2002 | Soane et al. |
| 6,387,492 B2 | 5/2002 | Soane et al. |
| 6,408,256 B1 | 6/2002 | Hittle et al. |
| 6,472,476 B1 | 10/2002 | Soane et al. |
| 6,485,530 B1 | 11/2002 | Soane et al. |
| 6,497,732 B1 | 12/2002 | Linford et al. |
| 6,497,733 B1 | 12/2002 | Ware, Jr. et al. |
| 6,503,976 B2 | 1/2003 | Zuckerman et al. |
| 6,517,648 B1 | 2/2003 | Bouchette et al. |
| 6,517,933 B1 | 2/2003 | Soane et al. |
| 6,544,594 B2 | 4/2003 | Linford et al. |
| 6,566,544 B1 | 5/2003 | Waymouth et al. |
| 6,599,327 B2 | 7/2003 | Soane et al. |
| 6,607,564 B2 | 8/2003 | Soane et al. |
| 6,607,994 B2 | 8/2003 | Soane et al. |
| 6,617,267 B2 | 9/2003 | Soane et al. |
| 6,617,268 B1 | 9/2003 | Offord et al. |
| 6,620,515 B2 | 9/2003 | Feng et al. |
| 6,660,667 B2 | 12/2003 | Zuckerman et al. |
| 6,679,924 B2 | 1/2004 | Ware, Jr. et al. |
| 6,699,266 B2 | 3/2004 | Lachenbruch et al. |
| 6,716,526 B2 | 4/2004 | Weston et al. |
| 6,787,624 B2 | 9/2004 | Coates et al. |
| 6,793,856 B2 | 9/2004 | Hartmann et al. |
| 6,815,486 B2 | 11/2004 | Bhagwagar et al. |
| 6,822,062 B2 | 11/2004 | Mackenzie et al. |
| 6,830,782 B2 | 12/2004 | Kanazawa |
| 6,855,410 B2 | 2/2005 | Buckley |
| 6,855,422 B2 | 2/2005 | Magill et al. |
| 7,053,163 B1 | 5/2006 | Tian et al. |
| 7,074,490 B2 | 7/2006 | Feng et al. |
| 7,081,501 B2 | 7/2006 | Okawa et al. |
| 7,119,154 B2 | 10/2006 | Coates et al. |
| 7,135,424 B2 | 11/2006 | Worley et al. |
| 7,160,612 B2 | 1/2007 | Magill et al. |
| 7,241,497 B2 | 7/2007 | Magill et al. |
| 7,268,243 B2 | 9/2007 | Coates et al. |
| 7,300,994 B2 | 11/2007 | Coates et al. |
| 7,560,523 B2 | 7/2009 | Coates et al. |
| 7,666,500 B2 | 2/2010 | Magill et al. |
| 7,790,283 B2 | 9/2010 | Hartmann et al. |
| 7,790,810 B2 | 9/2010 | Coates et al. |
| 8,221,910 B2 * | 7/2012 | Hartmann et al. ............ 428/507 |
| 2001/0052193 A1 | 12/2001 | Payet et al. |
| 2002/0009473 A1 | 1/2002 | Tebbe |
| 2002/0068152 A1 | 6/2002 | Heath et al. |
| 2002/0120988 A1 | 9/2002 | Soane et al. |
| 2002/0122890 A1 | 9/2002 | Linford et al. |
| 2002/0152560 A1 | 10/2002 | Soane et al. |
| 2002/0155771 A1 | 10/2002 | Soane et al. |
| 2002/0160675 A1 | 10/2002 | Linford et al. |
| 2002/0164473 A1 | 11/2002 | Buckley |
| 2002/0189024 A1 | 12/2002 | Soane et al. |
| 2002/0190408 A1 | 12/2002 | Houston et al. |
| 2002/0193028 A1 | 12/2002 | Zuckerman et al. |
| 2003/0008078 A1 | 1/2003 | Soane et al. |
| 2003/0013369 A1 | 1/2003 | Soane et al. |
| 2003/0027962 A1 | 2/2003 | Wagener et al. |
| 2003/0035951 A1 | 2/2003 | Magill et al. |
| 2003/0051295 A1 | 3/2003 | Soane et al. |
| 2003/0054141 A1 | 3/2003 | Worley et al. |
| 2003/0068482 A1 | 4/2003 | Koch et al. |
| 2003/0079302 A1 | 5/2003 | Soane et al. |
| 2003/0101518 A1 | 6/2003 | Linford et al. |
| 2003/0101522 A1 | 6/2003 | Linford et al. |
| 2003/0102080 A1 | 6/2003 | Mallik |
| 2003/0104134 A1 | 6/2003 | Linford et al. |
| 2003/0143180 A1 | 7/2003 | Giroud et al. |
| 2003/0145397 A1 | 8/2003 | Ware, Jr. et al. |
| 2004/0011989 A1 | 1/2004 | Lin et al. |
| 2004/0026659 A1 | 2/2004 | Lin |
| 2004/0029472 A1 | 2/2004 | Lin |
| 2004/0033743 A1 | 2/2004 | Worley et al. |
| 2004/0043212 A1 | 3/2004 | Grynaeus et al. |
| 2004/0044128 A1 | 3/2004 | Lin et al. |
| 2004/0048541 A1 | 3/2004 | Offord et al. |
| 2004/0055093 A1 | 3/2004 | Offord et al. |
| 2004/0058006 A1 | 3/2004 | Barry et al. |
| 2004/0192835 A1 | 9/2004 | Steidl et al. |
| 2004/0258922 A1 | 12/2004 | Willett et al. |
| 2004/0260085 A1 | 12/2004 | Kriesel et al. |
| 2005/0046182 A1 | 3/2005 | Trapp et al. |
| 2005/0077208 A1 | 4/2005 | Miller et al. |
| 2005/0106392 A1 | 5/2005 | Sano et al. |
| 2005/0175560 A9 | 8/2005 | Ferrari |
| 2005/0208286 A1 | 9/2005 | Hartmann et al. |
| 2005/0208300 A1 | 9/2005 | Magill et al. |
| 2005/0233145 A1 | 10/2005 | Abe et al. |
| 2005/0281979 A1 * | 12/2005 | Toas et al. .................... 428/113 |
| 2006/0037150 A1 | 2/2006 | Offord et al. |
| 2006/0043328 A1 | 3/2006 | Hunt et al. |
| 2006/0101997 A1 | 5/2006 | Py et al. |
| 2006/0178475 A1 | 8/2006 | Bentley et al. |
| 2006/0188582 A1 | 8/2006 | Naylor Da Rocha Gomes |
| 2006/0277933 A1 | 12/2006 | Smith |
| 2006/0286319 A1 | 12/2006 | Magill et al. |
| 2007/0026228 A1 | 2/2007 | Hartmann et al. |
| 2007/0049714 A1 | 3/2007 | Coates et al. |
| 2007/0079825 A1 | 4/2007 | Sera et al. |
| 2007/0104745 A1 | 5/2007 | Stewart et al. |
| 2007/0120927 A1 | 5/2007 | Snyder et al. |
| 2007/0165990 A1 | 7/2007 | Magill et al. |
| 2007/0173154 A1 | 7/2007 | Hartmann et al. |
| 2007/0212967 A1 | 9/2007 | Grynaeus et al. |
| 2007/0287008 A1 | 12/2007 | Hartmann et al. |
| 2008/0193761 A1 | 8/2008 | Naylor Rocha Gomes et al. |
| 2008/0214854 A1 | 9/2008 | Coates et al. |

(56) References Cited

U.S. PATENT DOCUMENTS

| | | | |
|---|---|---|---|
| 2009/0035557 A1* | 2/2009 | Hartmann et al. | 428/331 |
| 2009/0192278 A1 | 7/2009 | Coates et al. | |
| 2010/0012883 A1* | 1/2010 | Hartmann et al. | 252/70 |
| 2010/0015430 A1* | 1/2010 | Hartmann et al. | 428/323 |
| 2010/0015869 A1* | 1/2010 | Hartmann et al. | 442/59 |
| 2010/0016513 A1* | 1/2010 | Hartmann et al. | 525/327.3 |
| 2010/0029882 A1 | 2/2010 | Coates et al. | |
| 2010/0036077 A1 | 2/2010 | Coates et al. | |
| 2010/0264353 A1 | 10/2010 | Hartmann et al. | |
| 2012/0225290 A1 | 9/2012 | Hartmann et al. | |

FOREIGN PATENT DOCUMENTS

| | | |
|---|---|---|
| CN | 1252025 C | 4/2006 |
| CN | 101189385 A | 5/2008 |
| EP | 1484378 | 12/2004 |
| EP | 1783169 A2 | 5/2007 |
| EP | 1871948 A2 | 1/2008 |
| ES | 2298056 A1 | 5/2008 |
| FR | 2691969 A1 | 12/1993 |
| JP | 05-163485 A | 12/1991 |
| JP | 04163370 A2 | 6/1992 |
| JP | 04219349 B2 | 8/1992 |
| JP | 5005215 A2 | 1/1993 |
| JP | 05156570 A2 | 6/1993 |
| JP | 05156576 A2 | 6/1993 |
| JP | 5214672 A2 | 8/1993 |
| JP | 5239716 A2 | 9/1993 |
| JP | 5331754 A2 | 12/1993 |
| JP | 6041818 A2 | 2/1994 |
| JP | 2006200417 A2 | 7/1994 |
| JP | 06234840 A2 | 8/1994 |
| JP | 07-053917 | 9/1996 |
| JP | 08246227 A2 | 9/1996 |
| JP | 08311716 A1 | 11/1996 |
| JP | 11247069 A2 | 9/1999 |
| JP | 11350240 A2 | 12/1999 |
| JP | 2000313895 A | 11/2000 |
| JP | 2001172866 A2 | 6/2001 |
| JP | 2002087953 A | 3/2002 |
| JP | 2002317329 A1 | 10/2002 |
| JP | 2002348780 A2 | 12/2002 |
| JP | 2003020568 A2 | 1/2003 |
| JP | 2003027337 A2 | 1/2003 |
| JP | 2003520871 A | 7/2003 |
| JP | 2003268358 A2 | 9/2003 |
| JP | 2003268359 A2 | 9/2003 |
| JP | 2003268679 A2 | 9/2003 |
| JP | 2003293223 A2 | 10/2003 |
| JP | 2004003087 A2 | 1/2004 |
| JP | 2004011032 A2 | 1/2004 |
| JP | 2004026971 A | 1/2004 |
| JP | 2004027189 A2 | 1/2004 |
| JP | 2004043676 A | 2/2004 |
| JP | 2004510068 A | 4/2004 |
| JP | 2004161885 A2 | 6/2004 |
| JP | 2004324023 A | 11/2004 |
| JP | 2005036097 A2 | 2/2005 |
| JP | 2005503497 A | 2/2005 |
| JP | 2007137971 A2 | 6/2007 |
| JP | 2008522056 A | 6/2008 |
| JP | 537028 T2 | 9/2008 |
| JP | 2009524542 | 7/2009 |
| KR | 20040071118 | 8/2004 |
| PT | 0103265 A | 10/2006 |
| WO | 9324534 A1 | 12/1993 |
| WO | 9825710 A1 | 6/1998 |
| WO | 9949124 A2 | 9/1999 |
| WO | 0106054 A1 | 1/2001 |
| WO | 0135511 A2 | 5/2001 |
| WO | 0154809 A1 | 8/2001 |
| WO | 0212607 A2 | 2/2002 |
| WO | 0224789 A2 | 3/2002 |
| WO | 2004007631 A1 | 1/2004 |
| WO | 2004098767 A1 | 11/2004 |
| WO | 2005017247 A2 | 2/2005 |
| WO | 2005040300 A1 | 6/2005 |
| WO | 2005097935 A1 | 10/2005 |
| WO | 2006013165 A1 | 2/2006 |
| WO | 2006098851 A2 | 9/2006 |
| WO | 2006117702 A1 | 11/2006 |
| WO | 2007040395 A1 | 4/2007 |
| WO | 2007082559 A1 | 7/2007 |
| WO | 2007130709 A3 | 11/2007 |
| WO | 2008014164 A1 | 1/2008 |
| WO | 2008041191 A2 | 4/2008 |
| WO | 2008061885 A2 | 5/2008 |
| WO | 2008135208 A1 | 11/2008 |
| WO | 2010008908 A1 | 1/2010 |
| WO | 2010008909 A1 | 1/2010 |
| WO | 2010008910 A1 | 1/2010 |
| WO | 2012121848 A2 | 9/2012 |

OTHER PUBLICATIONS

Zalba, B., et al., "Review on Thermal Energy Storage with Phase Change: materials, heat transfer analysis, and applications", "Applied Thermal Engineering", , pp. 3185-3191, vol. 23, No. (2003), Published in: US.

Aldrich Chemical Co., "Olefin Metathesis" "ChemFiles" 2009, p. 12 vol. 9, No. 6, Publisher: sigma-adrich.com, Published in: US.

Atiqullah, M., et al., "Synthesis of Functional Polyolefins using Metallocenes: A Comprehensive Review" "Polymer Reviews" downloaded Aug. 30, 2012, Apr. 19, 2010, pp. 178-230, vol. 50, No. 2, Publisher: King Fand University of Petroleum & Minerals, Published in: US.

BASF, Inc., "Specification Sheet for Laromer Grades" Sep. 2007, p. 4, Published in: US.

Baughman, T.W., "Functionalized Ethylene Copolymers and Materials Via Olefin Metathesis Polymerization" "Dissertation to the University of Florida" 2006, p. 204 Publisher: U. Fla., Published in: US.

Berda, Eric B., "ADMET Amphiphiles", "Dissertation to the University of Florida" 2008, p. 149 Publisher: U. Fla., Published in: US.

Clariant, "Your Universally Applicable Polymer: Functional Chemicals Division" 2006, p. 36 Publisher: Clariant International Ltd, Functional Chemicals Division, Published in: CH.

Clariant, "Colour Chronicle", "Colour Chronicle 2" Oct. 2011, p. 28 No. 2, Publisher: Clariant Chemicals (India) Limited Publication, Published in: IN.

Zonghua, Ren, "Chinese Office Action re Application No. 200780003506.6" Apr. 28, 2012, p. 7, Published in: CN.

Zongua, Ren, "Chinese Office Action re Application No. 200780003506.6" Jul. 9, 2010, p. 14, Published in: CN.

Chenggong, Jia, "Chinese Office Action re Application No. 200980132239.1", Mar. 5, 2013, p. 22, Published in: CN.

Chenggong, Jia, "Chinese Office Action re Application No. 200980132054.0", Apr. 23, 2013, p. 22, Published in: CN.

Chenggong, Jia, "Chinese Office Action re Application No. 200980132232.X", Jun. 4, 2013, p. 5, Published in: CN.

Goodman, et al., "Stereochemistry of Polymers and Biopolymers", "Polytechnic School of Brooklyn", 1966, p. 27 Publisher: Polymer Research Institute, Published in: US.

Masashi, Inoue, "Japanese Office Action re Application No. 2008-552584", Jan. 29, 2013, p. 5, Published in: JP.

Yamazaki, T., "Japanese Office Action re Application No. 2011-518770", May 29, 2013, p. 9, Published in: JP.

Kakuchi, et al., "Chiral Polymers", "Encyclopedia of Polymer Science and Technology", 2009, p. 32 Publisher: John Wiley & Sons, Inc., Published in: US.

Lee, Jae-Woong, "Korean Office Action re Application No. 2008-7020916", Apr. 26, 2013, p. 12, Published in: KR.

Boyle, Robert C., "Office Action re U.S. Appl. No. 12/174,607", Jun. 14, 2013, p. 39, Published in: US.

Boyle, Robert C., "Office Action re U.S. Appl. No. 12/174,609", Jun. 17, 2013, p. 42, Published in: US.

Boyle, Robert C., "Office Action re U.S. Appl. No. 12/486,396", Jul. 2, 2013, p. 25, Published in: US.

(56) References Cited

OTHER PUBLICATIONS

Rea, Christine, "Office Action re U.S. Appl. No. 13/040,692", Jul. 18, 2013, p. 86, Published in: US.
Salvatore, Lynda, "Office Action re U.S. Appl. No. 12/185,908", Aug. 16, 2013, p. 13, Published in: US.
Meng, Q., et al., "A Temperature-Regulating Fiber made of PEG-Based Smart Copolymer", "Solar Energy Materials & Solar Cells", 2008, pp. 1245-1252, No. 92, Publisher: Elsevier B.V.
Neugeboren, Craig A., "Response to Office Aciton re U.S. Appl. No. 12/185,908", May 1, 2013, p. 15, Published in: US.
Gruber, Stephen S., "Response to Office Action re U.S. Appl. No. 13/040,692", May 6, 2013, p. 12, Published in: US.
Atsushi Aoki, et al., "Japanese Office Action re Application No. 2013-504882", Mar. 11, 2014, p. 5, Published in: JP.
Chenggong, Jia, "Chinese Office Action re Application No. 200980132054.0", Jan. 16, 2014, p. 7, Published in: CN.
Chenggong, Jia, "Chinese Office Action re Application No. 200980132239.1", Jan. 23, 2014, p. 6, Published in: CN.
Koga, Tetsuji, "Response to Japanese Office Action re Application No. 2011-518770", Nov. 7, 2013, p. 2, Published in: JP.
Fukui, M., "Japanese Office Action re Application No. 2011-518769", Nov. 28, 2013, p. 12, Published in: JP.
Fukui, M., "Japanese Office Action re Application No. 2011-518771", Nov. 28, 2013, p. 8, Published in: JP.
Neugeboren, Craig A., "Response to Office Action re U.S. Appl. No. 12/185,908", Feb. 11, 2014, p. 15 Published in: US.
Neugeboren, Craig A., "Response to Office Action re U.S. Appl. No. 12/486,396", Jan. 2, 2014, p. 8 Published in: US.
Gruber, Stephen S., "Response to Office Action re U.S. Appl. No. 13/040,692", Sep. 18, 2013, p. 9, Published in: US.
Chenggong, Jia, "Chinese Office Action re Application No. 200980132054.0", Aug. 7, 2014, p. 7, Published in: CN.
Ieki, Masami, "Japanese Office Action re Application No. 2013-161059", Jul. 29, 2014, p. 6, Published in: JP.
Lee, Jae-Woong, "Korean Office Action re Application No. 2013-7027992", Feb. 6, 2014, p. 13, Published in: KR.
Geun-Wan, Lee, "Korean Office Action re Application No. 2014-7016979", Aug. 14, 2014, p. 5, Published in: KR.
Chenggong, Jia, "Chinese Office Action re Application No. 200980132232X", Jun. 13, 2014, p. 15, Published in: CN.
Chenggong, Jia, "Response to Chinese Office Action re Application No. 20098013054.0", Apr. 24, 2014, p. 6, Published in: CN.
Hollender, C., "European Search Report re Application No. 09798539", Jun. 5, 2014, p. 4, Published in: EP.
Hollender, C., "Extended European Seach Report re Appl. No. PCT/US2009/048551", Jun. 13, 2014, p. 8, Published in: EP.
Holldender, C., "Extended European Search Report re Application No. PCT/US2009/048555", Jun. 25, 2014, p. 8, Published in: EP.
Koga, Tetsuji, "Response to Japanese Office Action re Application No. 2011-518769", Jun. 3, 2014, p. 14, Published in: JP.
Boyle, Robert C., "Office Action re U.S. Appl. No. 12/486,396", Feb. 27, 2014, p. 19, Published in: US.
Salvatore, Lynda, "Office Action re U.S. Appl. No. 12/185,908", Jun. 9, 2014, p. 50, Published in: US.
Wittmann-Regis, Agnes, "International Preliminary Report on Patentability re Application No. PC/TUS2012/025234", Feb. 13, 2014, p. 6, Published in: CH.
Zonghua, Ren, "Chinese Office Action re Application No. 201080066869.6", Jul. 1, 2014, p. 13, Published in: CN.
Markfort, Iris-Anne Lucie, "Extended European Search Report re Appl. No. 12754849.3", Jul. 21, 2015, p. 7, Published in: EP.
Matsumoto, Hiroshi, "Japanese Office Action re Application No. 2014-196365", Jul. 24, 2015, p. 8, Published in: JP.
Yoshizawa, Eiichi, "Japanese Office Action re Application No. 2011-518769", Aug. 25, 2015, p. 6, Published in: JP.
Zonghua, Ren, "Chinese Office Action re Application No. 201080066869.6", Nov. 18, 2015, p. 10, Published in: CN.
Zonghua, Ren, "Response to Chinese Office Action re Application No. 201080066869.6", Sep. 28, 2015, p. 12, Published in: CN.
Boyle, Robert C., "Office Action re U.S. Appl. No. 12/174,609", Aug. 11, 2010, p. 22, Published in: US.
Boyle, Robert C., "Office Action re U.S. Appl. No. 12/486,396", Sep. 9, 2011, p. 48, Published in: US.
Gugliotta, Nicole, "Office Action re U.S. Appl. No. 11/342,279", Sep. 16, 2011, p. 28, Published in: US.
Gugliotta, Nicole, "Office Action re U.S. Appl. No. 12/193,296", Sep. 19, 2011, p. 19, Published in: US.
Boyle, Robert C., "Office Action re U.S. Appl. No. 12/174,607", Sep. 23, 2011, p. 68, Published in: US.
Salvatore, Lynda, "Office Action re U.S. Appl. No. 12/185,908", Nov. 8, 2012, p. 36, Published in: US.
Rea, Christine, "Office Action re U.S. Appl. No. 13/040,692", Dec. 6, 2012, p. 50, Published in: US.
Boyle, Robert C., "Office Action re U.S. Appl. No. 12/174,607", Dec. 13, 2010, p. 2, Published in: US.
Gugliotta, Nicole T., "Office Action re U.S. Appl. No. 11/342,279", Dec. 27, 2010, p. 49, Published in: US.
Neugeboren, Craig, "Response to Office Action re U.S. Appl. No. 12/486,396", Jan. 9, 2012, p. 8, Published in: US.
Neugeboren, Craig, "Response to Office Action re U.S. Appl. No. 12/174,609", Feb. 11, 2011, p. 20, Published in: US.
Neugeboren, Craig, "Response to Office Action re U.S. Appl. No. 12/193,296", Mar. 19, 2012, p. 20, Published in: US.
Neugeboren, Craig, "Response to Office Action re U.S. Appl. No. 12/185,908", May 29, 2012, p. 8, Published in: US.
Neugeboren, Craig, "Response to Office Action re U.S. Appl. No. 11/342,279", Jun. 23, 2011, p. 11, Published in: US.
Neugeboren, Craig, "Response to Office Action re U.S. Appl. No. 12/174,607", Jul. 28, 2011, p. 20, Published in: US.
Neugeboren, Craig, "Response to Office Action re U.S. Appl. No. 12/174,609", Aug. 4, 2011, p. 20, Published in: US.
Neugeboren, Craig, "Response to Office Action re U.S. Appl. No. 12/486,396", Aug. 5, 2011, p. 2, Published in: US.
Neugeboren, Craig, "Response to Office Action re U.S. Appl. No. 12/486,396", Aug. 17, 2012, p. 6, Published in: US.
Gruber, Stephen S., "Reponse to Office Action re U.S. Appl. No. 12/193,296", Nov. 8, 2012, p. 8, Published in: US.
Neugeboren, Craig, "Response to office Action re U.S. Appl. No. 12/762,119", Nov. 28, 2011, p. 12, Published in: US.
Neugeboren, Craig, "Responce to Office Action re U.S. Appl. No. 12/174,607", Dec. 9, 2010, p. 7, Published in: US.
Neugeboren, Craig, "Response to Office Action re U.S. Appl. No. 12/174,607", Dec. 13, 2011, p. 13, Published in: US.
Neugeboren, Craig, "Response to Office Action re U.S. Appl. No. 12/174,607", Dec. 21, 2010, p. 7, Published in: US.
Oakley, G. W., "Solid-State Olefin Metathesis", "Dissertation for the University of Florida", 2004, p. 157, Publisher: U. Fla., Published in: US.
Neugeboren, Craig, "Preliminary Amendment re U.S. Appl. No. 12/193,296", Jun. 28, 2011, p. 6, Published in: US.
Young, Lee W., "International Search Report and Written Opinion re Application No. PCT/US07/61081", Jul. 21, 2008, p. 12, Published in: PCT.
Nickitas-Etienne, Athina, "International Preliminary Report on Patentability re Application No. PCT/US09/048548", Jan. 18, 2011, p. 8, Published in: WO.
Young, Lee W., "Internartional Search Report and Written Opinion re Application No. PCT/US09/48548", Oct. 30, 2009, p. 15, Published in: WO.
Beijer, Gijsbertus, "International Preliminary Report on Patentability re Application No. PCT/US09/048550", Jan. 18, 2011, p. 8, Published in: WO.
Young, Lee W., "International Search Report and Writtion Opinion re Application No. PCT/US09/48550", Oct. 8, 2009, p. 10, Published in: WO.
Beijer, Gijsbertus, "International Preliminary Report on Patentability re Application No. PCT/US09/048551", Jan. 18, 2011, p. 5, Published in: WO.
Young, Lee W., "International Search Report and Written Opinion re Application No. PCT/US09/48551", Oct. 8, 2009, p. 12, Published in: WO.

(56) References Cited

OTHER PUBLICATIONS

Honda, Masashi, "International Preliminary Report on Patentability re Application No. PCT/US09/048555", Jan. 18, 2011, p. 6, Published in: WO.
Honda, Masashi, "International Preliminary Report on Patentability re Application No. PCT/US09/048557", Jan. 18, 2011, Published in: WO.
Young, Lee W., "International Search Report and Written Opinion re Application No. PCT/US09/048555", Oct. 30, 2009, p. 12, Published in: WO.
Young, Lee W., "International Search Report and Written Opinion re Application No. PCT/US09/48557", Oct. 6, 2009, p. 11, Published in: WO.
Nakamura, Yukari, "International Preliminary Report on Patentability re Application No. PCT/US10/058351", , p. 7, Published in: WO, Oct. 16, 2012.
Young, Lee. W., "International Search Report and Written Opinion re Application No. PCT/US12/25234", May 30, 2012, p. 8, Published in: PCT.
Hartmann, M., et al., "Specification for related PCT Patent Application No. PCT/US07/71373 filed", Jun. 15, 2012, Published in: PCT.
Piel, C., "Polymerization of Ethene and Ethene-co-a-Olefin: Investigations on Short- and Long-Chain Branching and Structure-Proper", "Dissertation to the University of Hamburg" 2005, p. 159, Publisher: U. Hamburg, Published in: DE.
Rhodia PPMC, "Tolonate and Rhodocoat Product Specifications" Jun. 2004, p. 4, Published in: US.
Rojas, G., "ADMET Linear-Low Density Polyethylene: Synthesis, Characterization and Thermal Behavior of Precisely and Irregularly Se", "Dissertation to the University of Florida" 2008, p. 198, Publisher: U. Fla., Published in: US.
Rose, J. M., et al., "Living Polymerization of a-Olefins with an a-Diimine Ni(II) Catalyst: Formation of Well-Defined Ethylene-Propylene Copo", "J. Am. Chem. Soc." 2006, pp. 4186-4187, vol. 128, No. 13, Publisher: Am. Chem. Soc'y, Published in: US.
Sanitized, "Silica/quat Sanitized T 99-19" Webpage found at http://www.sanitized.com/en/business-partners/trademark-products/active-ingredients/silicaquat-t-99-19.html downloaded Aug. 30, 2012, p. 2, Publisher: Sanitized, Published in: US.
Stephens, C.H., et al., "Comparison of Propylene/Ethylene Copolymers Prepared with Different Catalysts" Published online in Wiley InterScience (www.interscience.wiley.com), 2006, p. 8, Publisher: Wiley Periodicals, Inc., Published in: US.
Su, J.C., et al., "A Novel Solid-Solid Phase Change Heat Storage Material with Polyurethane Block Copolymer Structure", "Energy Conversion and Management" pp. 3185-3191, vol. 47, No. (2006), Published in: US.
Sworen, J.C., "Modeling Linear-Low Density Polyethylene: Copolymers Containing Precise Structures" "Dissertation to the University of Florida" 2004, p. 219 Publisher: U. Fla., Published in: US.
Thomson Research Associates, "Adding Value through Antimicrobial Product Protection: Ultra-Fresh—time tested performance" Webpage located at http://www.ultra-fresh.com/home.php downloaded Jul. 12, 2012, p. 2, Publisher: Thomson Research Associates, Published in: US.
Vasile, C., et al., "Practical Guide to Polyethylene" 2005, p. 188 Publisher: Rapra Technology Limited, Published in: GB.
Wagner, N. L., et al., "Random Block Copolymers via Segment Interchange Olefins Metathesis", "Macromolecular Rapid Communications" 2008, p. 6, Publisher: Wiley-VCH Verlag GmbH, Published in: US.
Zonghua, Ren, "Chinese Office Action re Application No. 200780003506.6" Aug. 31, 2011, p. 8, Published in: CN.
Chenggong, Jia, "Chinese Office Action re Application No. 200980132232.X" Nov. 1, 2012, p. 53, Published in: CN.
Zonghua, Ren, "Response to Chinese Office Action re Application No. 200780003506.6" Jan. 20, 2011, p. 6, Published in: CN.
Neugeboren, Craig, "Response to Chinese Office Action Apr. 28, 2012 re Application No. 300780003506.6" Aug. 21, 2012, p. 3, Published in: US.
Neugeboren, Craig, "Reponse to Chinese Office Action Aug. 31, 2011 re Application No. 300780003506.6" Oct. 26, 2011, p. 3, Published in: US.
Neugeboren, Craig, "Reponse to Chinese Office Action Jul. 9, 2010 re Application No. 300780003506.6" Dec. 21, 2010, p. 5, Published in: US.
Domski, G.J., et al., "Living alkene polymerization: New methods for the precision synthesis of polyolefins", "Prog. Polym. Sci." Nov. 2006, p. 30-92, vol. 32, No. (2007), Publisher: Elsevier Ltd., Published in: US.
Dow, "Dow Elastomers: ENGAGE Product Selection Guide" Webpage located at http://www.dow.com/elastomers/lit/engage_lit.html downloaded Jul. 10, 2012, Mar. 2012, p. 4 Publisher: The Dow Chemical Company, Published in: US.
Dow, "Dow Elastomers: AFFINITY Product Selection Guide" Webpage located at http://www.dow.com/elastomers/lit/affinity_lit.htm downloaded Jul. 10, 2012, Nov. 2010, p. 4 Publisher: The Dow Chemical Company, Published in: US.
Dow Corning, "Dow Corning 8650 Polymer and Dow Corning BY16/876 Product Information Sheet", May 6, 2005, p. 2 Published in: US.
DuPont, "DuPont Elvaloy resins" Webpage found at http://www2.dupont.com/Elvaloy/en_US downloaded, Oct. 19, 2012, p. 1 Publisher: DuPont, Published in: US.
DuPont, "DuPont Nucrel" Webpage located at http://www2.dupont.com/Nucrel/en_US/ downloaded Jul. 10, 2012, 2012, No. 2, Publisher: DuPont, Published in: US.
Eldridge, J.E., et al., "Studies of the Cross-Linking Process in Gelatin Gels. III. Dependence of Melting Point on Concentration and Molecular We" Nov. 1954, p. 992-995, vol. 58, Publisher: U. Wis., Published in: US.
Lorenz, Markus, "Response to EP Office Action re Application No. 08022533.7" Nov. 16, 2010, p. 29, Published in: EP.
Lorenz, Markus, "Response to European Office Action re Application No. 08022532.9" Nov. 16, 2010, p. 22, Published in: EP.
Hollender, C., "European Search Report re Application No. 08022533.7" Dec. 4, 2009, p. 7, Published in: EP.
Hollender, C., "European Search Report re Application No. 08022532.9" Dec. 4, 2009, p. 6, Published in: EP.
ExxonMobil, "Specialty Elastomers: Exact plastomers" Webpage located at http://www.exxonmobilchemical.com/Chem-English/brands/exact-plastomers.aspx?In=productsservices downloaded Jul. 10, 2012, p. 1 Publisher: ExxonMobil Chemical, Published in: US.
Fan, W., et al., "Alternating Stereospecific Copolymerization of Ethylene and Propylene with Metallocene Catalysts", "J. Am. Chem. Soc." Sep. 8, 2001, p. 9555-9563, vol. 2001, No. 123, Publisher: Am. Chem. Soc'y, Published in: US.
Fujita, T., et al., "Polymerization of Alkenes" "Comprehensive Organometallic Chemistry III" 2007, pp. 691-734, No. 11.20, Publisher: Elsevier, Ltd.
Halosource Corporate, "Applications" Webpage found at http://www.haloshield.com/how/applications downloaded Aug. 30, 2012, p. 1 Publisher: HaloSource, Inc., Published in: US.
Hartmann, et al., "Specification for related U.S. Appl. No. 12/174,607, filed Jul. 16, 2008" p. 71, Published in: US.
Hartmann, et al., "Specification for related U.S. Appl. No. 12/174,609, filed Jul. 16, 2008" p. 68, Published in: US.
Hartmann, Mark, "Declaration of Mark Hartmann Under 37 C.F.R. 1.132" Feb. 11, 2011. p. 10, Published in: US.
Hexion Specialty Chemicals, "Heloxy Modifier 68 Technical Data Sheet" 2005, p. 4, Published in: US.
Hu, Ji, et al., "Study on Phase Change Characteristics of PET-PEG Copolymers", "Journal of Macromolecular Science" Feb. 23, 2006, pp. 615-621, vol. B:Physics, No. 45, Published in: US.
Idemitsu Technofine Co., Ltd., "Specification for Airtechno Fabric" p. 3, Sep. 25, 2003.
Ivin, K.J., et al., "Olefin Metathesis and Metathesis Polymerization" 1997, p. 184, Publisher: Academic Press, Published in: US.
Aoki, et al., "Japanese Office Action re Application No. 2008-552584" Oct. 4, 2011, p. 5, Published in: JP.
Neugeboren, Craig, "Reponse to Japanese Office Action re Application No. 2008-552584" Apr. 3, 2012, Published in: US.

(56) References Cited

OTHER PUBLICATIONS

Kumar, A., "Morphology, Crystallization and Melting Behavior of Statistical Copolymers of Propylene with Ethylene, 1-Butene, 1-Hexen" "Dissertation for Virginia Polytechnic Institute and State University" Jun. 21, 2001, p. 129, Publisher: Va. Poly. Inst., Published in: US.
Neugeboren, Craig, "Response to Office Action re U.S. Appl. No. 11/342,279" Feb. 8, 2010, p. 14, Published in: US.
Boyle, Robert C., "Office Action Re U.S. Appl. No. 12/174,607" Feb. 14, 2011, p. 17, Published in: US.
Boyle, Robert C., "Office Action re U.S. Appl. No. 12/486,396" Feb. 17, 2012, p. 15, Published in: US.
Boyle, Robert C., "Office Action re U.S. Appl. No. 12/486,396" Mar. 8, 2011, p. 10, Published in: US.
Boyle, Robert C., "Office Action re U.S. Appl. No. 12/174,609" Apr. 6, 2011, p. 35, Published in: US.
Salvatore, Lynda, "Office Action re U.S. Appl. No. 12/185,908" Apr. 26, 2012, p. 7, Published in: US.
Salvatore, Lynda, "Office Action re U.S. Appl. No. 12/762,119" Jun. 10, 2011, p. 29, Published in: US.
Gugliotta, Nicole, "Office Action re U.S. Appl. No. 111/342,279" Jun. 11, 2010, p. 28, Published in: US.
Gugliotta, Nicole T., "Office Action re U.S. Appl. No. 11/342,279" Aug. 6, 2009, p. 18, Published in: US.
Gugliotta, Nicole, "Office Action re U.S. Appl. No. 12/193,296" Aug. 8, 2012, p. 23, Published in: US.
Boyle, Robert C., "Office Action re U.S. Appl. No. 12/174,607" Aug. 10, 2010, p. 9, Published in: US.
Haiqing, Li, "Chinese Office Action re Application No. 201210440162.8", Sep. 16, 2014, p. 12 Published in: CN.
Miyazaki, Daisuke, "Japanese Office Action re Application No. 2013-086016", Aug. 5, 2014, p. 6 Published in: JP.
Kawano, Ryuchiro, "Japanese Office Action re Application No. 2013-504882", Nov. 18, 2014, p. 6 Published in: JP.
Xiaowei, Gao, Chinese Office Action re Application No. 201080066869.6, May 11, 2015, p. 10, Published in: CN.
Huang, Shuhui, Response to Chinese Office Action re Application No. 2012104401628, Mar. 31, 2015, p. 8, Published in: CN.
Matsunami, Yumiko, Japanese Office Action re Application No. 2011-518769, Jan. 27, 2015, p. 10, Published in: JP.
Ichinomiya, Rie, Japanese Office Action re Application No. 2008-500731, Sep. 10, 2013, p. 4, Published in: JP.
Nakamura, Yusuke, Japanese Office Action re Application No. 2012-539986, Dec. 2, 2014, p. 10, Published in: JP.
Seiwa, Response to Japanese Office Action re Application No. 2013-086016, Feb. 4, 2015, p. 4, Published in: JP.
Seiwa, Response to Japanese Office Action re Application No. 2014-003397, May 28, 2015, p. 3, Published in: JP.
Lee, Geun-Wan, Korean Office Action re Application No. 2014-7016979, Feb. 13, 2015, p. 10, Published in: KR.
Mulcahy, Peter D., Office Action re U.S. Appl. No. 11/078,656, Jan. 5, 2012, p. 12, Published in: US.
Mulcahy, Peter D., Office Action re U.S. Appl. No. 11/078,656, Mar. 29, 2013, p. 25, Published in: US.
Mulcahy, Peter D., Office Action re U.S. Appl. No. 11/078,656, Mar. 31, 2014, p. 31, Published in: US.
Gugliotta, Nicole T., Office Action re U.S. Appl. No. 13/779,035, Jun. 1, 2015, p. 9, Published in: US.
Mulcahy, Peter D., Office Action re U.S. Appl. No. 11/078,656, Jun. 13, 2012, p. 19, Published in: US.
Mulcahy, Peter D, Office Action re U.S. Appl. No. 11/078,656, Sep. 27, 2011, p. 19, Published in: US.
Neugeboren, Craig A., Response to Office Action re U.S. Appl. No. 11/078,656, Mar. 2, 2012, p. 11, Published in: US.
Gruber, Stephen S., Response to Office Action re U.S. Appl. No. 11/078,656, Jul. 30, 2013, p. 18, Published in: US.
Gruber, Stephen S., Response to Office Action re U.S. Appl. No. 11/078,656, Oct. 15, 2012, p. 15, Published in: US.
Gruber, Stephen S., Office Action re U.S. Appl. No. 11/078,656, Dec. 12, 2013, p. 8, Published in: US.
Neugeboren, Craig A., Response to Office Action re U.S. Appl. No. 11/078,656, Dec. 19, 2011, p. 11, Published in: US.

* cited by examiner

Polymeric PCM with reactive endgroups

R〜〜〜〜〜〜〜〜〜〜〜〜〜〜〜〜〜〜〜〜〜R$_1$

R = any textile reactive functional group, R$_1$ = can be same as R or H

Fig.3

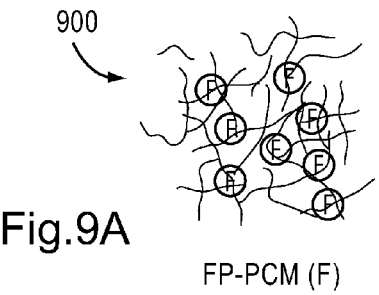
Fig.9A  FP-PCM (F)
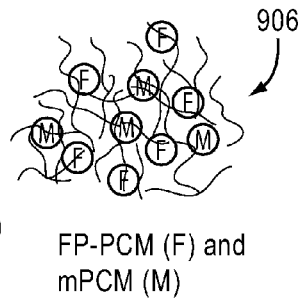
Fig.9D  FP-PCM (F) and mPCM (M)
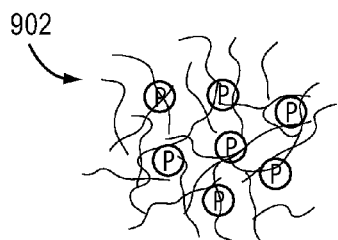
Fig.9B  P-PCM (P)
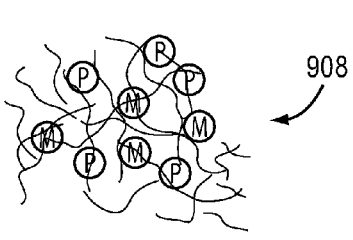
Fig.9E  P-PCM and (P) mPCM (M)
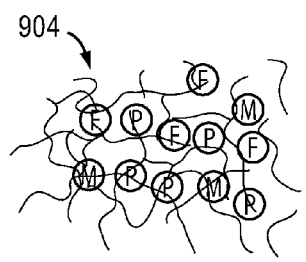
Fig.9C  FP-PCM (F) and P-PCM (P) and mPCM(M)

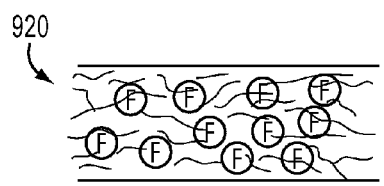
Fig.10A  FP-PCM (F)
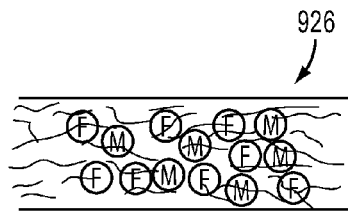
Fig.10D  FP-PCM (F) and mPCM (M)
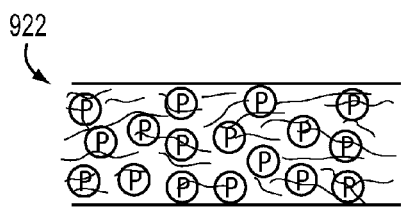
Fig.10B  P-PCM (P)
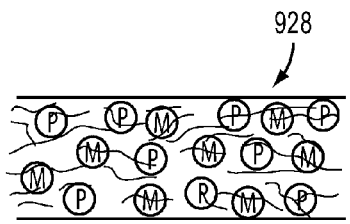
Fig.10E  P-PCM (P) and mPCM (M)
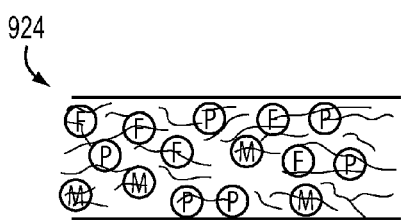
Fig.10C  FP-PCM (F) and P-PCM (P) and mPCM (M)

THERMAL REGULATING BUILDING MATERIALS AND OTHER CONSTRUCTION COMPONENTS CONTAINING PHASE CHANGE MATERIALS

RELATED APPLICATIONS

The present application is related to commonly owned and assigned U.S. application Ser. No. 12/762,119, entitled Thermal Regulating Building Materials and other Construction Components Containing Polymeric Phase Change Materials, filed on Apr. 16, 2012, U.S. application Ser. No. 12/174,607, entitled Functional Polymeric Phase Change Materials and Methods of Manufacturing the Same, filed on Jul. 16, 2008, U.S. application Ser. No. 12/174,609, entitled Functional Polymeric Phase Change Materials, filed on Jul. 16, 2008, U.S. application Ser. No. 12/185,908, entitled Articles Containing Functional Polymeric Phase Change Materials and Methods of Manufacturing the Same, filed on Aug. 5, 2008, U.S. application Ser. No. 12/193,296, entitled Microcapsules and Other Containment Structures for Articles Incorporating Functional Polymeric Phase Change Materials, filed on Aug. 18, 2008, and U.S. application Ser. No. 12/486,396, entitled Heat Regulating Article With Moisture Enhanced Temperature Control, filed on Jun. 17, 2009. The details of these applications are incorporated herein by reference in their entirety.

PRIORITY

The present application is a continuation of, and claims priority under 35 U.S.C. §120 to U.S. patent application Ser. No. 12/762,119, filed on Apr. 16, 2010, which is a continuation-in-part, of U.S. application Ser. No. 12/174,607, entitled Functional Polymeric Phase Change Materials and Methods of Manufacturing the Same, filed on Jul. 16, 2008, application Ser. No. 12/174,609, entitled Functional Polymeric Phase Change Materials, filed on Jul. 16, 2008, and U.S. application Ser. No. 12/185,908, entitled Articles Containing Functional Polymeric Phase Change Materials and Methods of Manufacturing the Same, filed on Aug. 5, 2008. The details of these applications are incorporated herein by reference in their entirety.

FIELD OF THE INVENTION

In general, the present invention relates to construction and building material components containing phase change materials, which may or may not be functionally reactive. In particular, but not by way of limitation, the present invention relates to articles, and in particular, building materials and other construction components, containing polymeric phase change materials.

BACKGROUND OF THE INVENTION

The modification of textiles to provide temperature regulating properties through the generalized use of phase change materials (PCMs) is known. The use of microencapsulated PCM (mPCM), their methods of manufacture and applications thereof have also been widely disclosed. For example, the following references all use microcapsules in their application:
1. U.S. Pat. No. 5,366,801—Fabric with Reversible Enhanced Thermal Properties
2. WO0212607—Thermal Control Nonwoven
3. U.S. Pat. No. 6,517,648—Process for Preparing a Non-Woven Fibrous Web
4. JP05-156570—Fibrous Structure having Heat Storage Ability and its Production
5. US20040029472—Method and compound fabric with latent heat effect
6. US20040026659—Composition for Fabricating Phase-Change Material Microcapsules and a Method for Fabricating the Microcapsules
7. US20040044128—Method and Microcapsule Compound Waterborne Polyurethane
8. US2004011989—Fabric Coating Composition with Latent Heat Effect and Method for Fabricating the Same
9. US20020009473—Microcapsule, Method for its Production, Use of same, and Coating Liquid with Such
10. JP11350240—Production of Fiber having Adhered Microcapsule on Surface
11. JP2003-268679—Yarn having Heat Storage Property and Woven Fabric using the same.

Microcapsules, however, are expensive, can rupture, need additional resinous binders for adhesion, and can cause poor fabric flexibility and properties.

Numerous other disclosures outline the development of temperature regulating textiles by first manufacturing a fiber that contains a PCM or mPCM. For example, the following all disclose compositions, methods of manufacture, processes, and fabrics created from synthetically manufactured fibers. While this might be acceptable in some circumstances, the applications disclosed below omit all of the natural cellulosic and proteinaceous fibers and fabrics such as cotton, flax, leather, wool, silk, and fur. They also do not allow for the post treatment of synthetic fibers, fabrics or other materials.
12. US20030035951—Multi-Component Fibers having Enhanced Reversible Thermal Properties and Methods of Manufacturing Thereof.
13. U.S. Pat. No. 4,756,958—Fiber with Reversible Enhance Thermal Storage Properties and Fabrics made there from.
14. JP5331754—Heat Absorbing and Releasing Nonwoven Fabric of Conjugate Fiber
15. JP6041818—Endothermic and Exothermic Conjugate Fiber
16. JP5239716—Thermally Insulating Conjugate Fiber
17. JP8311716—Endothermic and Exothermic Conjugate Fiber
18. JP5005215—Endothermic and Exothermic Conjugate Fiber
19. JP2003027337—Conjugate Fiber Having Heat-Storing and Heat-Retaining Property
20. JP07-053917—Heat-Accumulating and Heat-Insulating Fiber
21. JP2003-293223—Endothermic Conjugate Fiber
22. JP02289916—Thermal Storage Fiber
23. JP03326189—Fiber with Heat Storage Ability
24. JP04-219349—Heat Storage Composition
25. JP06-234840—Heat Storage Material
26. JP Appl. #2001-126109—Heat Storage Fiber, Method of Producing the same, and Heat Storage Cloth Material
27. JP03352078—Heat Storage Material
28. JP04-048005—Fabric Product with Heat Storing Ability
29. WO0125511—Thermal Energy Storage Materials
30. JP02317329—Heat Storage Fiber-Method for Producing the same and Heat Storage Cloth Material
31. WO2004007631—Heat-Storage Material, Composition Therefore, and uses of these
32. JP2003-268358—Heat-Storage Material use around Body 33. JP2004-011032—Temperature-Controllable Fiber and Fabric
34. JP2004-003087—Heat Storable Composite Fiber and Cloth Material having Heat-Storing Properties
35. JP06200417—Conjugate Fiber Containing Heat-Accumulation Material and its Production
36. CN1317602—Automatic Temp-Regulating Fibre and its Products
37. U.S. Pat. No. 5,885,475—Phase Change Materials Incorporated throughout the Structure of Polymer Fibers In addition, U.S. Pat. Nos. 4,851,291, 4,871,615, 4,908,238, and 5897952 disclose the addition of polyethylene glycol (PEG), polyhydric alcohol crystals, or hydrated salt PCM to hollow and non-hollow fibers. The fibers can be natural or synthetic, cellulosic, protein based, or synthetic hydrocarbon based. The non-hollow fibers have PEG materials deposited or reacted on the surface to act like PCM. These are problematic in that they are very hydrophilic causing excessive moisture absorption problems, and wash durability problems. There is no known disclosure of the use of acrylic, methacrylic polymers or other hydrophobic polymeric PCMs for these applications.

U.S. Pat. No. 6,004,662 mentions the use of acrylate and methacrylate polymers with C16 to C18 alkyl side chains as PCMs but not as unencapsulated or functionalized or reacted to the surface of fibrous textiles.

U.S. Pat. Nos. 4,259,198 and 4,181,643 disclose the use of crystalline crosslinked synthetic resin selected from the group of epoxide resins, polyurethane resins, polyester resins and mixtures thereof which contain, as crystallite forming blocks, segments of long-chain dicarboxylic acids or diols as PCMs, but not in conjunction with fibers or textiles.

Specific fiber and textile treatments or finishes in which specific compounds are reacted onto the substrate to provide some thermal change (usually based on moisture) have been disclosed. These systems are not based on long side chain alkyl, or long chain glycol acrylates or methacrylates that undergo a thermal phase change to provide improved latent heat effects. Examples include:

38. JP2003-020568—Endothermic Treating Agent for Fiber Material
39. JP2002-348780—Hygroscopic and Exothermic Cellulose-Based Fiber
40. JP2001-172866—Hygroscopic and Exothermic Cellulose-Based Fiber Product having Excellent Heat Retaining Property
41. JP 11-247069—Warm Retainable Exothermic Cloth Various disclosures describe the use of acrylic or methacrylic copolymers containing long chain alkyl moieties for textile finishes but only for properties such as grease repellency, soil resistance, permanent press properties, and quickness of drying. They do not disclose or mention the use of high purity polymers as PCMs, latent heat storage treatments or textile finishes which can impart temperature regulation and improved comfort. More specifically, they do not disclose advantageous polymer architecture such as mol. wt., mol. wt. distribution or specific copolymer architecture. Example include:

42. U.S. Pat. No. 6,679,924—Dye fixatives
43. U.S. Pat. No. 6,617,268—Method for protecting cotton from enzymatic attack by cellulase enzymes
44. U.S. Pat. No. 6,617,267—Modified textile and other materials and methods for their preparation
45. U.S. Pat. No. 6,607,994—Nanoparticle-based permanent treatments for textiles
46. U.S. Pat. No. 6,607,564—Modified textiles and other materials and methods for their preparation
47. U.S. Pat. No. 6,599,327—Modified textiles and other materials and methods for their preparation
48. U.S. Pat. No. 6,544,594—Water-repellent and soil-resistant finish for textiles
49. U.S. Pat. No. 6,517,933—Hybrid polymer materials
50. U.S. Pat. No. 6,497,733—Dye fixatives
51. U.S. Pat. No. 6,497,732—Fiber-reactive polymeric dyes
52. U.S. Pat. No. 6,485,530—Modified textile and other materials and methods for their preparation
53. U.S. Pat. No. 6,472,476—Oil- and water-repellent finishes for textiles
54. U.S. Pat. No. 6,387,492—Hollow polymeric fibers
55. U.S. Pat. No. 6,380,336—Copolymers and oil- and water-repellent compositions containing them
56. U.S. Pat. No. 6,379,753—Modified textile and other materials and methods for their preparation
57. US20040058006—High affinity nanoparticles
58. US20040055093—Composite fibrous substrates having protein sheaths
59. US20040048541—Composite fibrous substrates having carbohydrate sheaths
60. US20030145397—Dye fixatives
61. US20030104134—Water-repellent and soil-resistant finish for textiles
62. US20030101522—Water-repellent and soil-resistant finish for textiles
63. US20030101518—Hydrophilic finish for fibrous substrates
64. US20030079302—Fiber-reactive polymeric dyes
65. US20030051295—Modified textiles and other materials and methods for their preparation
66. US20030013369—Nanoparticle-based permanent treatments for textiles
67. US20030008078—Oil- and water-repellent finishes for textiles
68. US20020190408—Morphology trapping and materials suitable for use therewith
69. US20020189024—Modified textiles and other materials and methods for their preparation
70. US20020160675—Durable finishes for textiles
71. US20020155771—Modified textile and other materials and methods for their preparation
72. US20020152560—Modified textiles and other materials and methods for their preparation
73. US20020122890—Water-repellent and soil-resistant finish for textiles
74. US20020120988—Abrasion- and wrinkle-resistant finish for textiles The use of phase change materials, including polymeric phase change materials, in building materials and other construction components has not been contemplated by the prior art in virtually any embodiment. The use of functionally reactive polymeric phase change materials is also not addressed in the prior art when incorporated into base materials and other building material substrates, such as insulation, roofing panels, siding, glass and various other glazing applications.

SUMMARY OF THE INVENTION

Exemplary embodiments are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In accordance with one aspect a thermally regulating construction material comprises a base material and a polymeric phase change material bound to the base material, wherein the base material provides reversible temperature regulation properties to the building construction material. In accordance with another aspect, an insulation material for use in building construction comprises a base material and a polymeric phase change material bound to the base material, wherein the base material provides reversible temperature regulation properties to the insulation material. In accordance with additional aspects the base material is selected from the group consisting of foam insulation, loose fill insulation, and batted insulation.

Many additional aspects and embodiments are described herein as would be recognized by one of ordinary skill in the art.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

FIG. 3 shows a representative example of an FP-PCM based on a crystallizable backbone polymer such as polyesters, polyethers, polyurethanes, polyamides, polyimides, polyacetals, polysulfides, polysulfones, etc where R=reactive functional groups on one end of the polymer chain;

FIGS. 9A-9E show various embodiments of loose fill insulation incorporating polymeric phase change materials;

FIGS. 10A-10E show various embodiments of batted insulation incorporating polymeric phase change materials;

DETAILED DESCRIPTION

Figure 1:
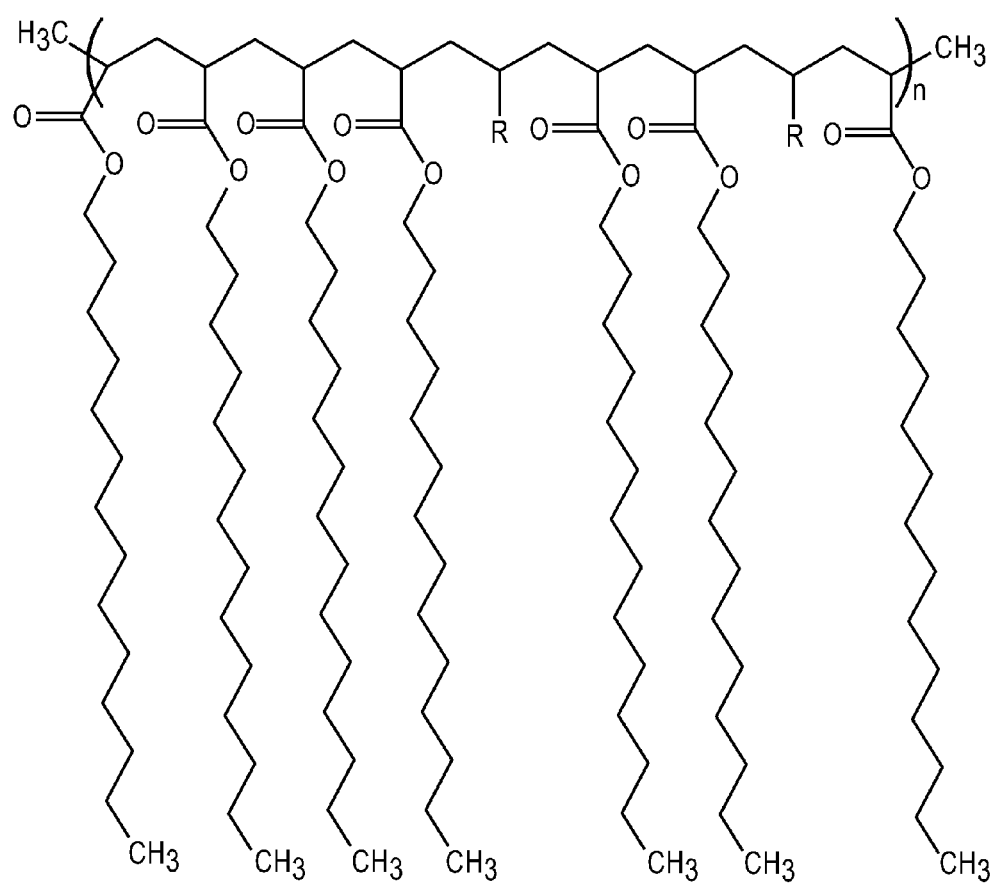
FIGS. 1 and 2 show representative examples of functional polymeric phase change materials (FP-PCMs) based on a (meth)acrylate backbone with crystallizable side chains based on long chain alky groups or long chain ether groups respectively where R=reactive functional groups.
Figure 1A:
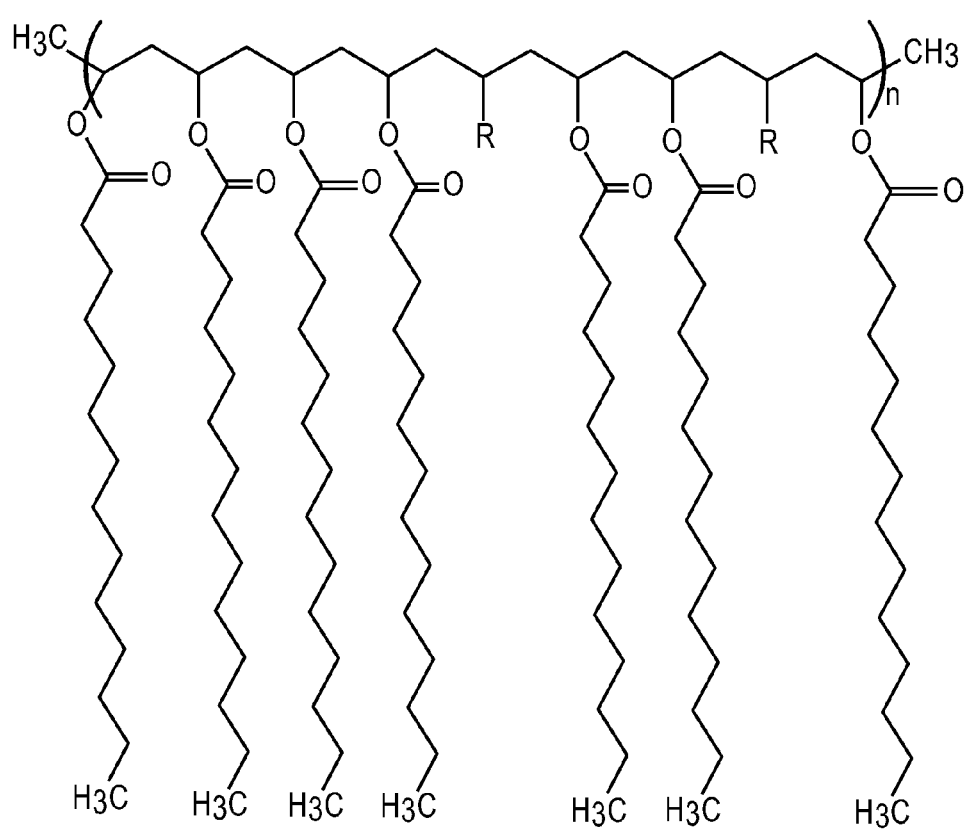
FIGS. 1a and 2a show representative examples of FP-PCMs based on a vinyl ester backbone with crystallizable side chains based on long chain alky groups or long chain ether groups respectively where R=reactive functional groups.
Figure 1B:
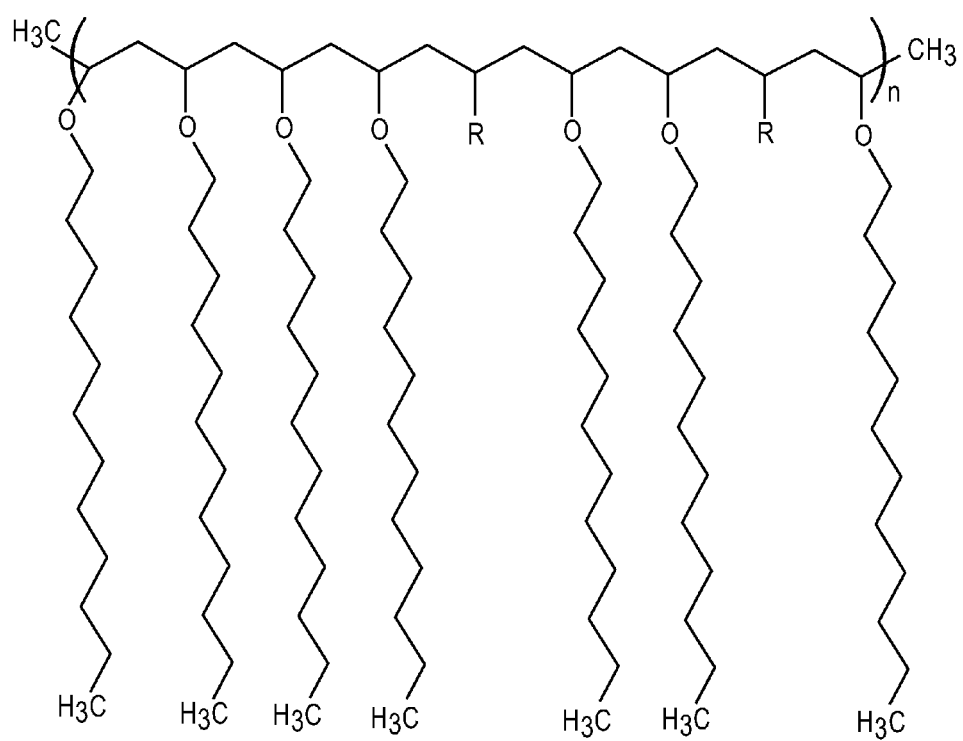
FIGS. 1b and 2b show representative examples of FP-PCMs based on a vinyl ether backbone with crystallizable side chains based on long chain alky groups or long chain ether groups respectively where R=reactive functional groups.
Figure 1C:
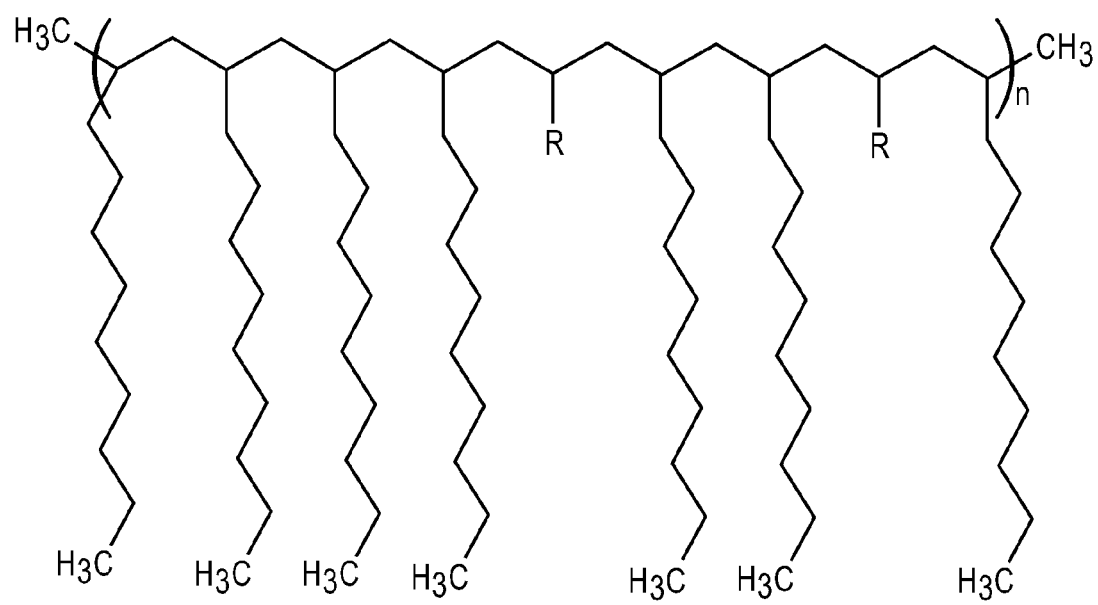
FIG. 1c shows a representative example of an FP-PCM based on a polyolefin backbone with crystallizable side chains based on long chain alky groups where R=reactive functional groups.

Definitions—The following definitions apply to various elements described with respect to various aspects of the invention. These definitions may likewise be expanded upon herein.

As used herein, the term "monodisperse" refers to being substantially uniform with respect to a set of properties. Thus, for example, a set of microcapsules that are monodisperse can refer to such microcapsules that have a narrow distribution of sizes around a mode of the distribution of sizes, such as a mean of the distribution of sizes. A further example is a set of polymer molecules with similar molecular weights.

As used herein, the term "latent heat" refers to an amount of heat absorbed or released by a material as it undergoes a transition between two states. Thus, for example, a latent heat can refer to an amount of heat that is absorbed or released as a material undergoes a transition between a liquid state and a crystalline solid state, a liquid state and a gaseous state, a crystalline solid state and a gaseous state, two crystalline solid states or crystalline state and amorphous state.

As used herein, the term "transition temperature" refers to an approximate temperature at which a material undergoes a transition between two states. Thus, for example, a transition temperature can refer to a temperature at which a material undergoes a transition between a liquid state and a crystalline solid state, a liquid state and a gaseous state, a crystalline solid state and a gaseous state, two crystalline solid states or crystalline state and amorphous state . . . . A temperature at which an amorphous material undergoes a transition between a glassy state and a rubbery state may also be referred to as a "glass transition temperature" of the material.

As used herein, the term "phase change material" refers to a material that has the capability of absorbing or releasing heat to adjust heat transfer at or within a temperature stabilizing range. A temperature stabilizing range can include a specific transition temperature or a range of transition temperatures. In some instances, a phase change material can be capable of inhibiting heat transfer during a period of time when the phase change material is absorbing or releasing heat, typically as the phase change material undergoes a transition between two states. This action is typically transient and will occur until a latent heat of the phase change material is absorbed or released during a heating or cooling process. Heat can be stored or removed from a phase change material, and the phase change material typically can be effectively recharged by a source emitting or absorbing it. For certain implementations, a phase change material can be a mixture of two or more materials. By selecting two or more different materials and forming a mixture, a temperature stabilizing range can be adjusted for any desired application. The resulting mixture can exhibit two or more different transition temperatures or a single modified transition temperature when incorporated in the articles described herein.

As used herein, the term "polymer" refers to a material that includes a set of macromolecules. Macromolecules included in a polymer can be the same or can differ from one another in some fashion. A macromolecule can have any of a variety of skeletal structures, and can include one or more types of monomeric units. In particular, a macromolecule can have a skeletal structure that is linear or non-linear. Examples of non-linear skeletal structures include branched skeletal structures, such those that are star branched, comb branched, or dendritic branched, and network skeletal structures. A macromolecule included in a homopolymer typically includes one type of monomeric unit, while a macromolecule included in a copolymer typically includes two or more types of monomeric units. Examples of copolymers include statistical copolymers, random copolymers, alternating copolymers, periodic copolymers, block copolymers, radial copolymers, and graft copolymers. In some instances, a reactivity and a functionality of a polymer can be altered by addition of a set of functional groups, such as acid anhydride groups, amino groups and their salts, N-substituted amino groups, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof. Such functional groups can be added at various places along the polymer, such as randomly or regularly dispersed along the polymer, at ends of the polymer, on the side, end or any position on the crystallizable side chains, attached as separate dangling side groups of the polymer, or attached directly to a backbone of the polymer. Also, a polymer can be capable of cross-linking, entanglement, or hydrogen bonding in order to increase its mechanical strength or its resistance to degradation under ambient or processing conditions. As can be appreciated, a polymer can be provided in a variety of forms having different molecular weights, since a molecular weight of the polymer can be dependent upon processing conditions used for forming the polymer. Accordingly, a polymer can be referred to as having a specific molecular weight or a range of molecular weights. As used herein with reference to a polymer, the term "molecular weight" can refer to a number average molecular weight, a weight average molecular weight, or a melt index of the polymer.

Examples of polymers (including those polymers used for crosslinkers and binders) include polyhydroxyalkonates, polyamides, polyamines, polyimides, polyacrylics (e.g., polyacrylamide, polyacrylonitrile, and esters of methacrylic acid and acrylic acid), polycarbonates (e.g., polybisphenol A carbonate and polypropylene carbonate), polydienes (e.g., polybutadiene, polyisoprene, and polynorbornene), polyepoxides, polyesters (e.g., polycaprolactone, polyethylene adipate, polybutylene adipate, polypropylene succinate, polyesters based on terephthalic acid, and polyesters based on phthalic acid), polyethers (e.g., polyethylene glycol or polyethylene oxide, polybutylene glycol, polypropylene oxide, polyoxymethylene or paraformaldehyde, polytetramethylene ether or polytetrahydrofuran, and polyepichlorohydrin), polyfluorocarbons, formaldehyde polymers (e.g., urea-formaldehyde, melamine-formaldehyde, and phenol formaldehyde), natural polymers (e.g., polysaccharides, such as cellulose, chitan, chitosan, and starch; lignins; proteins; and waxes), polyolefins (e.g., polyethylene, polypropylene, polybutylene, polybutene, and polyoctene), polyphenylenes, silicon-containing polymers (e.g., polydimethyl siloxane and polycarbomethyl silane), polyurethanes, polyvinyls (e.g., polyvinyl butyral, polyvinyl alcohol, esters and ethers of polyvinyl alcohol, polyvinyl acetate, polystyrene, polymethylstyrene, polyvinyl chloride, polyvinyl pyrrrolidone, polymethyl vinyl ether, polyethyl vinyl ether, and polyvinyl methyl ketone), polyacetals, polyarylates, alkyd-based polymers (e.g., polymers based on glyceride oil), copolymers (e.g., polyethylene-co-vinyl acetate and polyethylene-co-acrylic acid), and mixtures thereof. The term polymer is meant to be construed to include any substances that become available after the filing of this application and that exhibit the general polymeric properties described above.

As used herein, the term "chemical bond" and its grammatical variations refer to a coupling of two or more atoms based on an attractive interaction, such that those atoms can form a stable structure. Examples of chemical bonds include covalent bonds and ionic bonds. Other examples of chemical bonds include hydrogen bonds and attractive interactions between carboxy groups and amine groups.

As used herein, the term "molecular group" and obvious variations thereof, refers to a set of atoms that form a portion of a molecule. In some instances, a group can include two or more atoms that are chemically bonded to one another to form a portion of a molecule. A group can be neutral on the one hand or charged on the other, e.g., monovalent or polyvalent (e.g., bivalent) to allow chemical bonding to a set of additional groups of a molecule. For example, a monovalent group can be envisioned as a molecule with a set of hydride groups removed to allow chemical bonding to another group of a molecule. A group can be neutral, positively charged, or negatively charged. For example, a positively charged group can be envisioned as a neutral group with one or more protons (i.e., H+) added, and a negatively charged group can be envisioned as a neutral group with one or more protons removed. A group that exhibits a characteristic reactivity or other set of properties can be referred to as a functional group, reactive function or reactive functional groups. Examples of reactive functional groups include such as acid anhydride groups, amino groups, N-substituted amino groups and their salts, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

As used herein, the term "covalent bond" means a form of chemical bonding that is characterized by the sharing of pairs of electrons between atoms, or between atoms and other covalent bonds. Attraction-to-repulsion stability that forms between atoms when they share electrons is known as covalent bonding. Covalent bonding includes many kinds of interactions, including σ-bonding, π-bonding, metal-metal bonding, agostic interactions, and three-center two-electron bonds.

Figure 4:
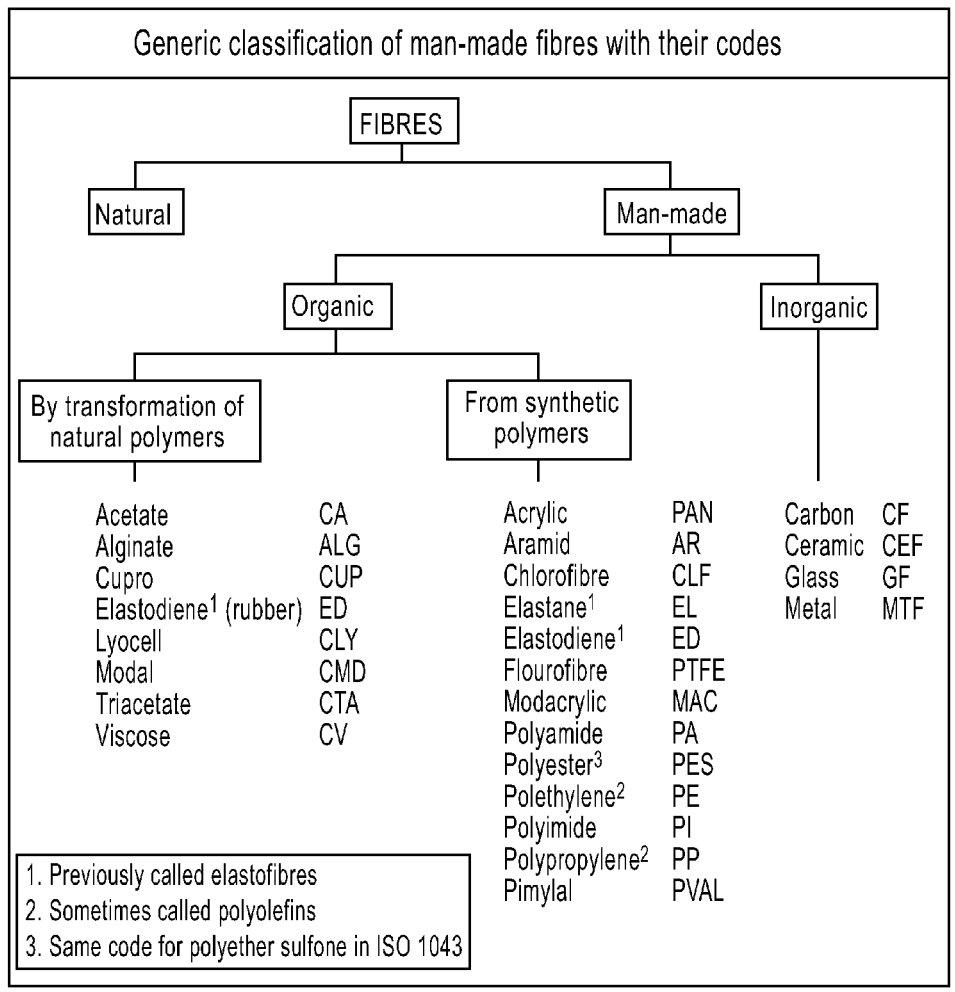
FIG. 4 is a chart depicting the generic classifications of man-made fibers which can incorporate FP-PCM or be made into wovens, knits, nonwoven or other substrates which can be treated with FP-PCM.

The reactive function could be of various chemical natures. For example, reactive functions capable of reacting and forming electrovalent bonds or covalent bonds with reactive functions of various substrates, e.g. cotton, wool, fur, leather, polyester and textiles made from such materials, as well as other base materials. For example, materials made from natural, regenerated or synthetic polymers/fibers/materials may form a electrovalent bond. Further examples of such substrates include various types of natural products including animal products such as alpaca, angora, camel hair, cashmere, catgut, chiengora, llama, mohair, silk, sinew, spider silk, wool, and protein based materials, various types of vegetable based products such as bamboo, coir, cotton, flax, hemp, jute, kenaf, manila, piña, raffia, ramie, sisal, and cellulose based materials; various types of mineral based products such as asbestos, basalt, mica, or other natural inorganic fibers. Generally, man-made fibers are classified into three classes, those made from natural polymers, those made from synthetic polymers and those made from inorganic materials. FIG. 4 depicts the generic classification of man made fibers with their International Bureau for the Standardization of Man-Made Fibres (BISFA) codes. A general description follows.

Fibers from Natural Polymers—The most common natural polymer fibre is viscose, which is made from the polymer cellulose obtained mostly from farmed trees. Other cellulose-based fibers are cupro, acetate and triacetate, lyocell and modal. The production processes for these fibers are given within this disclosure. Less common natural polymer fibers are made from rubber, alginic acid and regenerated protein.

Fibers from Synthetic Polymers—There are very many synthetic fibers, i.e. organic fibers based on petrochemicals. The most common are polyester, polyamide (often called nylon), acrylic and modacrylic, polypropylene, the segmented polyurethanes which are elastic fibers known as elastanes (or spandex in the USA), and specialty fibers such as the high performance aramids.

Fibers from Inorganic Materials—The inorganic man-made fibers are fibers made from materials such as glass, metal, carbon or ceramic. These fibers are very often used to reinforce plastics to form composites.

Examples of suitable reactive functional groups include functional groups such as acid anhydride groups, amino groups, N-substituted amino groups and their salts, amide groups, carbonyl groups, carboxy groups and their salts, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

Further details of the variety of examples of reactive functions and functional groups that may be used in accordance with one or more aspects of the present invention can be found in commonly owned and co-pending patent application Ser. Nos. 12/174,607 and 12/174,609, the details of which have been incorporated by reference into this disclosure. It should be clearly understood that by providing examples of specific compositions and methods in the later part of this description, applicant does not intend to limit the scope of the claims to any of those specific composition. To the contrary, it is anticipated that any combination of the functional groups, polymeric phase change materials, and articles described herein may be utilized to achieve the novel aspects of the present invention. The claims are not intended to be limited to any of the specific compounds described in this disclosure or any disclosure incorporated herein.

Several publications referenced herein deal with polymeric PCMs (P-PCM), which in a way, present an intermediate case between the solid-liquid PCMs and the solid-solid PCMs. P-PCMs are solid both prior to phase change and after it. The difference is in their degree of structure. At lower temperatures, that degree is greater than that at the elevated temperature, so that at a temperature of phase change, P-PCM converts from the more structured form into its less structured one. Typically, in the more structures form, some sections of the polymer are better aligned and more closely compacted. The better aligned sections resemble crystallites. Therefore, the phase change on heating P-PCM is also referred to as change from a more crystallized form to a less crystallized form. Differently put, at the elevated temperatures (above the transition temperature), P-PCMs are essentially amorphous. At the lower temperatures (below the transition temperature) they have a degree of crystallinity. Similarly, the changes on heat absorption and on heat release could be referred to as decrystallization and recrystallization, respectively. The related enthalpy could also be referred to as enthalpy of decrystallization.

Typically, P-PCMs have sections that are capable of being better aligned and more closely compacted. Such sections could be referred to as crystallizable sections. In some embodiments, the functional polymeric PCM described herein in accordance with various aspects of the present invention comprises at least one such crystallizable section. According to an embodiment of the invention, the polymer comprises a backbone and side chains. Preferably, the side chains form a crystallizable section.

As used here, the term "reactive function" means a chemical group (or a moiety) capable of reacting with another chemical group to form a covalent or an electrovalent bond, examples of which are given above. Preferably, such reaction is doable at relatively low temperatures, e.g. below 200° C., more preferably below 100° C., and at conditions suitable to handle delicate substrates, e.g. textile. As used herein the term "carrying a function" and obvious variations of this term, means having a function bound to it, e.g. covalently or electrovalently.

The reactive function could be placed on (carried on or covalently bound or electrovalently bonded to) any part of the FP-PCM molecule, e.g. on a side chain, along the backbone chain or on at least one of the ends of the backbone chain or side chain. According to various embodiments of the invention, the FP-PCM comprises multiple reactive functions and those functions are spread at substantially regular intervals, stereospecifically (atactic, isotactic or syndiotactic) or randomly along the molecule, e.g. along the backbone chain. Any combination of these is also possible.

The molecular weight of FP-PCM of the present invention is preferably of at least 500 Daltons, more preferably at least 2000 Daltons. Preferably the weight of the crystallizable section forms at least 20%, more preferably at least 50%, and most preferably at least 70% of the total weight of the FP-PCM. Because individual polymer chains rarely have the exact same degree of polymerization and molar mass, there is a distribution around an average value. The Molar mass distribution (or molecular weight distribution) in a polymer describes the relationship between the number of moles of each polymer species ($N_i$) and the molar mass ($M_i$) of that species. The molar mass distribution of a polymer may be modified by polymer fractionation. When used herein, referring to the molecular weight of an FP-PCM takes these concepts into account. Different average values can be defined depending on the statistical method that is applied. The weighted mean can be taken with the weight fraction, the mole fraction or the volume fraction as shown in the formulas below where $M_n$ is the number average molar mass, $M_w$ is the weight average molar mass, $M_v$ is the viscosity average molar mass and $M_z$ is the average molar mass.

$$M_n = \frac{\sum M_i N_i}{\sum N_i}, \quad M_w = \frac{\sum M_i^2 N_i}{\sum M_i N_i}, \quad M_z = \frac{\sum M_i^3 N_i}{\sum M_i^2 N_i}, \quad M_v = \left[\frac{\sum M_i^{1+a} N_i}{\sum M_i N_i}\right]^{\frac{1}{a}}$$

The ratio of the weight average to the number average is called the polydispersity index. (Mn/Mw). The polydispersity index can be effected by polymer chain length, polymer chain branching or linearity, crosslinking or combinations of such. P-PCMs and FP-PCMs as disclosed herein can have a polydispersity index of 1-100, preferably 1-10.

Melt flow index or MFI is a measure of the ease of flow of the melt of a polymer. It is defined as the mass of polymer, in grams, flowing in ten minutes through a capillary of a specific diameter and length by a pressure applied via prescribed alternative gravimetric weights for alternative prescribed temperatures. The method is described in the similar standards ASTM D1238 and ISO 1133.

Melt flow rate is an indirect measure of molecular weight, with high melt flow rate corresponding to low molecular weight. At the same time, melt flow rate is a measure of the ability of the material's melt to flow under pressure. Melt flow rate is inversely proportional to viscosity of the melt at the conditions of the test, though it should be borne in mind that the viscosity for any such material depends on the applied force. Ratios between two melt flow rate values for one material at different gravimetric weights are often used as a measure for the broadness of the molecular weight distribution. Synonyms of Melt Flow Index are Melt Flow Rate and Melt Index. More commonly used are their abbreviations: MFI, MFR and MI. P-PCMs and FP-PCMs disclosed herein preferably have an MFI of 0.1-1000, preferably 1-50 when measured at 190° C., 2.16 kg.

The FP-PCM of the present invention has a single phase change temperature or multiple such temperatures. According to one embodiment, the FP-PCM has at least one phase change temperature in the range between −10° C. and 100° C., preferably between 10° C. and 60° C. and a phase change enthalpy of at least 25 J/g. In other embodiments, the FP-PCM or P-PCM has a phase change enthalpy of at least 20 J/g. In still other embodiments, the FP-PCM or P-PCM has a phase change enthalpy of at least 5 J/g.

The phase change at each of the temperatures has its own enthalpy, so that according to some of the embodiments, the article has a single phase change enthalpy and, according to other embodiments, multiple such enthalpies. As used herein, the term "overall phase change enthalpy" refers to the enthalpy of phase change in the case of article with a single phase change temperature and to the combined enthalpies in case of multiple phase change temperatures. According to an embodiment of the invention, the article has an overall phase change enthalpy of at least 2.0 Joules/gram (J/g) or 10 J/m².

While each of the FP-PCM molecules carries at least one reactive function, large FP-PCM molecules may carry multiple reactive functions. According to an embodiment of the invention, an FP-PCM carries at least one reactive function per 10,000 Daltons of the molecular weight and preferably two reactive functions. Reactive functions can be carried on either the backbone chain or any one of the side chains. More than one side chain may carry the reactive function. Various numbers of different reactive functions may be included in the FP-PCM as well. A single reactive function may be included in the FP-PCM and multiple reactive functions may be included in the FP-PCM. In one embodiment between 0-5 reactive functions are included in the FP-PCM. In another embodiment, between 0-10 reactive functions are included in the FP-PCM. In yet another embodiment, between 0-100 reactive functions are included in the 4 FP-PCM.

As indicated, the reactive function of the FP-PCM of the present invention should be capable of forming covalent or electrovalent bonds with various articles, compounds and other molecules, commonly referred to here as base materials or substrates. According to another embodiment, substrates are selected from a group consisting of cotton, wool, fur, leather, polyester and textiles made from such materials. Examples of reactive functions capable of forming covalent bonds are acid anhydride groups, amino groups, N-substituted amino groups, carbonyl groups, carboxy groups, cyclohexyl epoxy groups, epoxy groups, glycidyl groups, hydroxy groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or and combinations thereof. FP-PCMs capable of forming covalent bonds are disclosed in commonly assigned U.S. patent application Ser. No. 12/174, 607, the teaching of which is incorporated herein by reference in its entirety. Examples of reactive functions capable of forming electrovalent bonds are acid functions, basic functions, positively charged complexes and negatively charged complexes. FP-PCM capable of forming electrovalent bonds such as disclosed in commonly assigned U.S. patent application Ser. No. 12/174,609, the teaching of which is incorporated herein by reference in its entirety.

According to another embodiment of the invention, the article forming the substrate further comprises at least one other ingredient. Suitable ingredients may be selected from a group consisting of another FP-PCM, another PCM, microcapsules comprising PCM, microcapsules with other additives, binders, crosslinkers, blending polymers, compatibilizers, wetting agents, and additives. The FP-PCM may also be bound to the at least one other ingredient.

According to another embodiment, the functional polymeric phase change material is chemically bound to the substrate. Binding may be one of covalent binding, electrovalent binding, direct binding, or binding via a connecting compound. According to another embodiment, binding is such as the one resulting from a reaction between a reactive function of the FP-PCM and a reactive function of the substrate, preferably the binding is a result of such reaction. The substrate can be selected from the group consisting of textiles such as natural fibers, fur, synthetic fibers, regenerated fibers, woven fabric, knit fabric, nonwoven fabric, foams, paper, leather, plastic or polymeric layers such as plastic films, plastic sheets, laminates or combinations of above.

Textiles described herein can be used for any garment or article that comes in contact with a human or animal body. This includes hats, helmets, glasses, goggles, masks, scarves, shirts, baselayers, vests, jackets, underwear, lingerie, bras, gloves, liners, mittens, pants, overalls, bibs, socks, hosiery, shoes, boots, insoles, sandals, bedding, sleeping bags, blankets, mattresses, sheets, pillows, textile insulation, backpacks, sports pads/padding, etc. The textile article can contain the FP-PCM or can be coated, laminated or molded. For instance, fibers can be manufactured with the FP-PCM contained in the fiber, coated onto the fiber or treated in which the fiber and FP-PCM interact. This is applicable also to any step in a textile manufacturing process.

Articles described herein can be used in conjunction with one or more of the following categories of products and articles:

1. Shipping, storage or packaging containers/equipment such as paper, glass, metal, plastic, ceramic, organic or inorganic materials in the form of envelopes, sleeves, labels, cardboard, wrapping, wires, tiedowns, insulation, cushioning, pads, foams, tarps, bags, boxes, tubes, containers, sheet, film, pouches, suitcases, cases, packs, bottles, jars, lids, covers, cans, jugs, glasses, tins, pails, buckets, baskets, drawers, drums, barrels, tubs, bins, hoppers, totes, truck/ship containers or trailers, carts, shelves, racks, etc. These articles can especially be used in the food shipment, food delivery, medical shipment, medical delivery, body shipment, etc. industries.

2. Medical, health, therapeutic, curative, and wound management articles such as bandages, wraps, wipes, stents, capsules, drug, delivery devices, tubes, bags, pouches, sleeves, foams, pads, sutures, wires, etc.

3. Building, construction, and interior articles where energy management and off-peak energy demand reduction is desired. These articles can include such as upholstery, furniture, beds, furnishings, windows, window coatings, window treatments and coverings, wallboard, gypsum wallboard, insulation, foams, piping, tubes, wiring, laminates, bricks, stones, siding, panels for wall or ceiling, flooring, cabinets, building envelopes, building wrap, windows, glass and glazing products, wallpaper, paint, shingles, roofing, frames, etc. The use of alternative construction techniques and such articles are also included as straw bale construction, mud or adobe construction, brick or stone construction, metal container construction, etc.

In one group of embodiments, building materials and various other construction components may also incorporate into their structure polymeric phase change materials in order to provide temperature regulation, temperature buffering or other aspects of temperature control within a structure. These materials may utilize both functionally reactive polymeric PCMs (FP-PCM) or non-functionally reactive polymeric PCMs (P-PCM).

Depending on the specific application and environment, either functional or non-functional polymeric PCM materials may be preferable. As used herein, a building material is any material which is used for a construction purpose including both naturally occurring substances such as clay, wood and stone, as well as man-made and other artificial substances such as plastic, foam, and cement composites.

For example, structures and building components such as decks, porches, portable buildings, greenhouses, garages and carports, as well as windows, roofing materials, natural and artificial siding materials, raw construction materials such as concrete, asphalt, stonework, wood, insulations, glass, and various other engineered building products may incorporate one or more of the embodiments described herein relating to the use of polymeric PCMs in order to impart thermal regulating qualities on the overall structure or on the specific building component or material.

Figure 7:
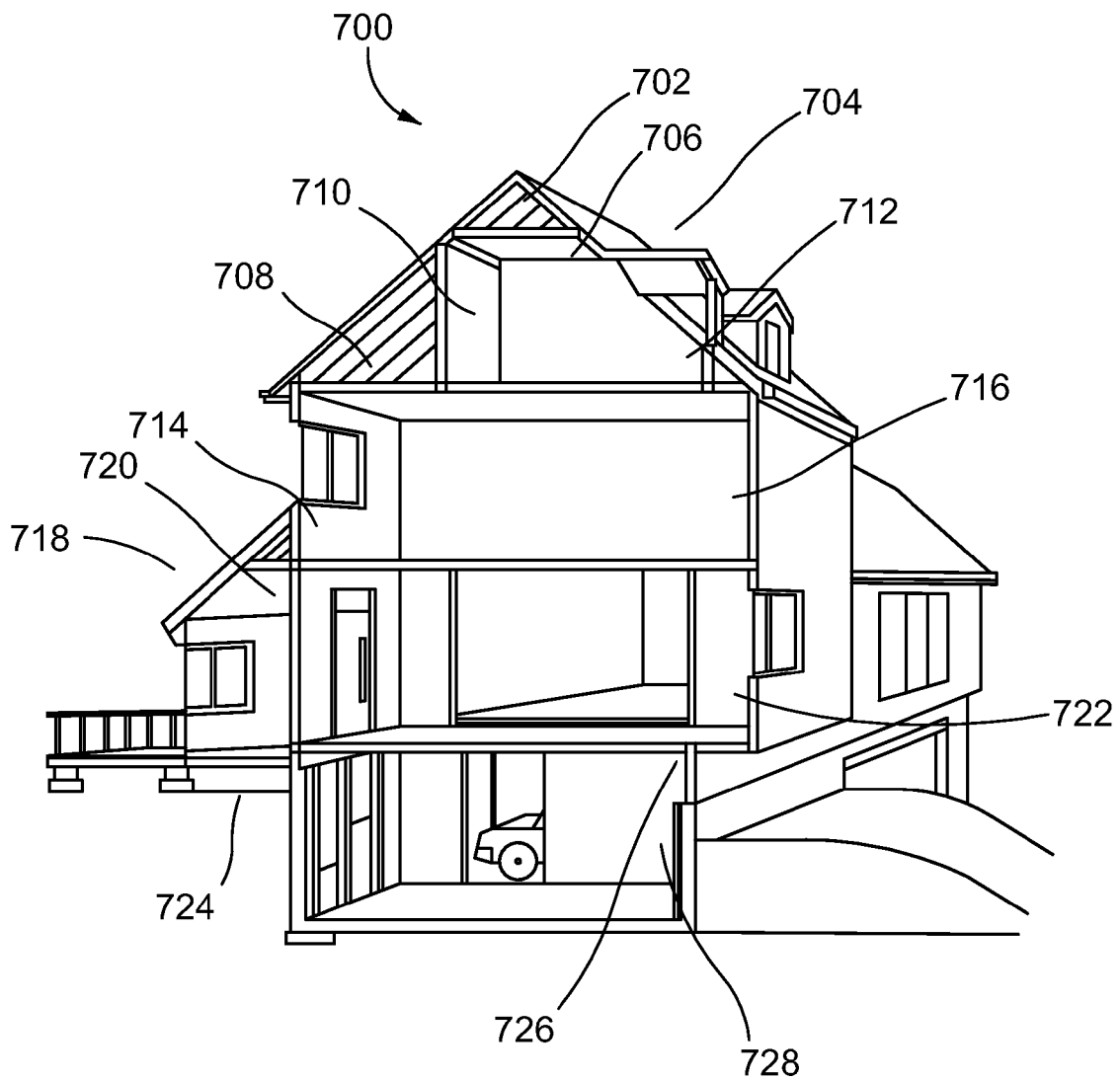
FIG. 7 is a diagram indicating various aspects of a typical building or other structure that may incorporate components that utilize polymeric phase change materials.

FIG. 7 shows an example of a typical structure and the various components that may incorporate in one or more forms, the polymeric phase change materials described herein. FIG. 7 shows a typical structure 700 such as a home, office building or other inhabitable building and the various spaces and other areas that would benefit from the use of insulation that includes the polymeric and functional polymeric phase change materials described herein. In addition to surfaces such as windows, roofing, siding, paint, and various exterior joints and other construction components, substrates and other spaces in building 700 that can incorporate temperature polymeric phase change materials for temperature regulation include area 702 between the attic and collar beams, area 704 between the cockloft and a flat roof, area 706 in the roof rafters adjacent to living or work spaces, area 708 in the attic floors, area 710 in knee walls adjacent to attic spaces, area 712 in knee walls adjacent to attic crawlspaces, area 714 in exterior walls adjacent to unheated spaces, area 716 in exterior walls, area 718 in sloping roofs heated areas, area 720 in ceilings below unheated areas, area 722 in exterior walls below window sections, area 724 in floors above crawlspaces, area 726 in exposed framing above foundations, area 728 in foundation walls in heated basements.

Increased energy efficiency and more robust heating and cooling capabilities can be achieved through the use of such materials and systems. For example, and in addition to the insulation products described above, roofing systems and other roofing products are well-suited for the incorporation of polymeric phase change materials. The thermal control and temperature regulating qualities of such PCMs serve to moderate or reduce energy costs for both heating and cooling buildings and other structures that incorporate these technologies.

Building Insulation Products:

Use of polymeric phase change materials in insulation products in order to increase the thermal efficiency and temperature regulation properties can apply to many types of insulation systems and materials. These include particulate insulation such as fiberglass fibers, fiberglass batting, fiberglass clusters, foamed polymeric insulation particles such as polyurethane, polystyrene, polyethylene, along with gypsum particles and wallboard materials. The insulation market is well-suited for the use of polymeric phase change materials and the accompanying thermal control qualities.

Both raw/unencapsulated P-PCMs and FP-PCMs contained within microcapsules may be attached to cellulose insulation particles and cellulose fiber insulation through chemical bonding. These materials may also include non-functionally reactive polymeric PCM since this material can be absorbed or coated onto the cellulose or other loose fill insulation.

Various types of building insulation can benefit from the embodiments described herein. Blankets, in the form of batts or rolls, are flexible products made from mineral fibers, including fiberglass or rock wool. They are available in widths suited to standard spacing of wall studs and attic or floor joists. They must be hand-cut and trimmed to fit wherever the joist spacing is non-standard (such as near windows, doors, or corners), or where there are obstructions in the walls (such as wires, electrical outlet boxes, or pipes). Batts can be installed by homeowners or professionals. They are available with or without vapor-retarder facings. Batts with a special flame-resistant facing are available in various widths for basement walls where the insulation will be left exposed. Blownin loose-fill insulation includes cellulose, fiberglass, or rock wool in the form of loose fibers or fiber pellets that are blown using pneumatic equipment, usually by professional installers. This form of insulation can be used in wall cavities. It is also appropriate for unfinished attic floors, for irregularly shaped areas, and for filling in around obstructions. In the open wall cavities of a new house, cellulose and fiberglass fibers can also be sprayed after mixing the fibers with an adhesive or foam to make them resistant to settling. Foam insulation can be applied by a professional using special equipment to meter, mix, and spray the foam into place. Polyicynene is an open-celled foam. Polyisocyanurate and polyurethane are closed-cell foams. In general, open-celled foam allows water vapor to move through the material more easily than closed-cell foam. However, open-celled foams usually have a lower R-value for a given thickness compared to closed-cell foams. So, some of the closed-cell foams are able to provide a greater R-value where space is limited. Rigid insulation is made from fibrous materials or plastic foams and is produced in board-like forms and molded pipe coverings. These provide full coverage with few heat loss paths and are often able to provide a greater R-value where space is limited. Such boards may be faced with a reflective foil that reduces heat flow when next to an air space. Rigid insulation is often used for foundations and as an insulative wall sheathing. Reflective insulation systems are fabricated from aluminum foils with a variety of backings such as kraft paper, plastic film, polyethylene bubbles, or cardboard. The resistance to heat flow depends on the heat flow direction, and this type of insulation is most effective in reducing downward heat flow. Reflective systems are typically located between roof rafters, floor joists, or wall studs. Radiant barriers are installed in buildings to reduce summer heat gain and winter heat loss. In new buildings, you can select foil-faced wood products for your roof sheathing (installed with the foil facing down into the attic) or other locations to provide the radiant barrier as an integral part of the structure. For existing buildings, the radiant barrier is typically fastened across the bottom of joists, as shown in this drawing. All radiant barriers must have a low emittance (0.1 or less) and high reflectance (0.9 or more).

P-PCMs and FP-PCMs can also be used to adhere or bind microcapsules or other particles to the insulation product giving the ability to mix different types of phase change materials into the end product.

Benefits of using the above materials in building materials and construction components include the following upstream and downstream reductions in energy usage.
1. Reduced microcapsule usage in those embodiments that include encapsulated phase change materials result in reduced processing, reduced green house gas emissions. and therefore reduced overall cost.
2. Reduced PCM migration or loss due to associated chemical bonding and attachment to insulation materials.
3. Ability to provide various PCM temperatures, latent heat capacities (e.g. joules/gram), thermal mass and increased energy retention properties to the base material.
4. Reduced dusting in cellulose and fiberous insulation base materials leading to less problems during application in buildings due to:
   a. reduction in dust and the accompanying fire/explosive hazard,
   b. less construction "dirt",
   c. less dusting and accompanying respiratory harm to workers,
   d. reductions in problems due to materials drying out or mold and mildew.
5. P-PCMs and FP-PCMs can also be either hydrophobic or hydrophilic to improve the moisture retention or drying properties of the insulation material.
   a. P-PCMs and FP-PCMs can be made hydrophobic and coated on the insulation material which improves the water/moisture repellency and reduces the water/moisture retention thereby reducing the ability for mold and mildew to grow.
   b. P-PCMs and FP-PCMs can be made hydrophilic or moisture wicking to move water/moisture out of the insulation material, allowing for faster drying and thereby reducing the ability for mold and mildew to grow.
6. Phase change material can be homogenously or non-homogenously throughout the insulation material The existing technology and related art, such as US2009011171, U.S. Pat. No. 5,770,295, U.S. Pat. No. 6,645,598, US 2003061776, US2003129330, US2006111001, US2008282637, US2008312359, US2005281979, US20050281979 fail to address these problems.

FIGS. 8A-8E show various embodiments of insulation that is either rigid, blown, flexible, slab, board or molded foam types of insulation. The examples and embodiments of the insulation shown in FIGS. 8A-8E can be either open or closed cell and comprised of any of the polymers described above. The cells within the insulation may be made of any shape as known in the manufacture of these insulation materials and may contain phase change materials of various compositions such as combinations of polymeric phase change materials (P-PCMs), functional polymeric phase change materials (FP-PCMs) and microencapsulated phase change materials (mPCMs). The PCM may reside within the foam or on the surface of the foam as well as being homogeneously or discontinuously dispersed throughout or on the foam. The PCM may be within the cells of the foam, outside of the cells, or on the inside or outside surfaces of the cells. Focusing on FIGS. 8A-8E, various of the above embodiments are shown. In FIGS. 8A-8E "F" represents an FP-PCM material, "P" represents a P-PCM material, and "M" represents an mPCM material.

Figure 8A:
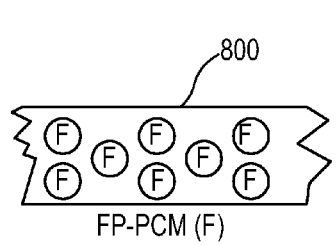
FIGS. 8A-8E show various embodiments of foam insulation incorporating polymeric phase change materials.
Figure 8D:
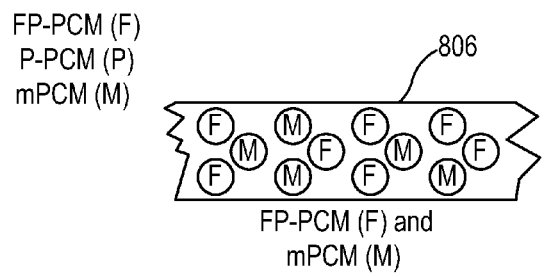
Figure 8B:
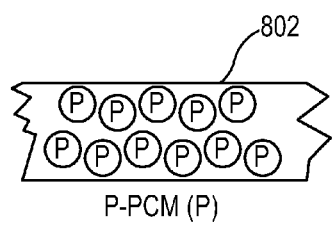
Figure 8E:
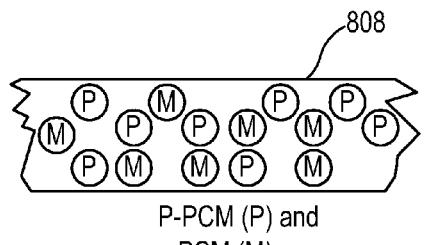
Figure 8C:
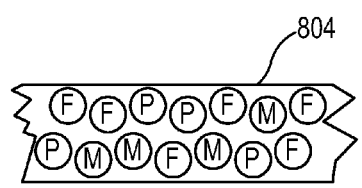

FIG. 8A shows a foam material 800 that includes an FP-PCM material within the foam. Note that the particular cell structures are not shown in FIGS. 8A-8E but as described above the particular polymeric material utilized can be within the cell or within the cell interstices. Following on the format of FIG. 8A, FIG. 8B shows a foam material 802 that includes a P-PCM material within the foam, FIG. 8C shows a foam material 804 that includes a P-PCM material, a FP-PCM material and an mPCM material within the foam, FIG. 8D shows a foam material 806 that includes a FP-PCM material and an mPCM material within the foam, FIG. 8E shows a foam material 808 that includes a P-PCM and am mPCM material within the foam. Various other permutations of the mPCM, P-PCM and FP-PCM materials can be used to form foam insulation materials as described herein.

The base material used to create the foam insulations described in conjunction with FIGS. 8A-8E may be one of several materials including each and every one of the polymers disclosed above.

With reference to FIGS. 9A-9E various embodiments of loose fill or blown insulation are shown. These embodiments may be made from base materials such as fiberglass, cellulose, and/or fibers and the polymeric material may cover all or just a portion of the fiber. The polymeric material may be absorbed into or on the surface of the particle or fiber and it may be homogeneously dispersed or discontinuous. The polymeric material may be used to bind the particles or fibers together or it may be used to simply cover the fibers. As with the examples shown in FIGS. 8A-8E, FIGS. 9A-9E show various embodiments of the use of P-PCMs, FP-PCMs, and mPCMs as used in connection with loose fill insulation materials described above. In FIGS. 9A-9E "F" represents an FP-PCM material, "P" represents a P-PCM material, and "M" represents an mPCM material.

FIG. 9A shows a loose fill insulation material 900 that includes an FP-PCM material within the foam. Note that the particular fiber structures are not shown to scale in FIGS. 9A-9E. Following on the format of FIG. 9A, FIG. 9B shows loose fill insulation material 902 that includes a P-PCM material within the foam, FIG. 9C shows loose fill insulation material 904 that includes a P-PCM material, a FP-PCM material and an mPCM material within the fibers or fill material, FIG. 9D shows a loose fill insulation material 906 that includes a FP-PCM material and an mPCM material within the fiber or fill material, and FIG. 9E shows a loose fill insulation material 908 that includes a P-PCM and am mPCM material within the fiber or fill material. Various other permutations of the mPCM, P-PCM and FP-PCM materials can be used to form loose fill insulation material as described herein.

With reference to FIGS. 10A-10E various embodiments of a batting type insulation are shown. These embodiments may be made from base materials such as fiberglass, wool or another fiber or filament. The polymeric material may be used to bind the particles or fibers together or it may be used to simply cover the fibers. As with the examples shown in FIGS. 8 and 9, FIGS. 10A-10E show various embodiments of the use of P-PCMs, FP-PCMs, and mPCMs as used in connection with batting type insulation materials described above. In FIGS. 10A-10E "F" represents an FP-PCM material, "P" represents a P-PCM material, and "M" represents an mPCM material.

FIG. 10A shows a batting type insulation material 920 that includes an FP-PCM material within the batting. Note that the particular fiber structures are not shown to scale in FIGS. 10A-10E. Following on the format of FIG. 10A, FIG. 10B shows batting type insulation material 922 that includes a P-PCM material within the batting, FIG. 10C shows batting type insulation material 924 that includes a P-PCM material, a FP-PCM material and an mPCM material within the batting material, FIG. 10D shows a batting type insulation material 926 that includes a FP-PCM material and an mPCM material within the batting material, and FIG. 10E shows a batting type insulation material 928 that includes a P-PCM and am mPCM material within the batting material. Various other permutations of the mPCM, P-PCM and FP-PCM materials can be used to form loose fill insulation material as described herein.

Figure 11:
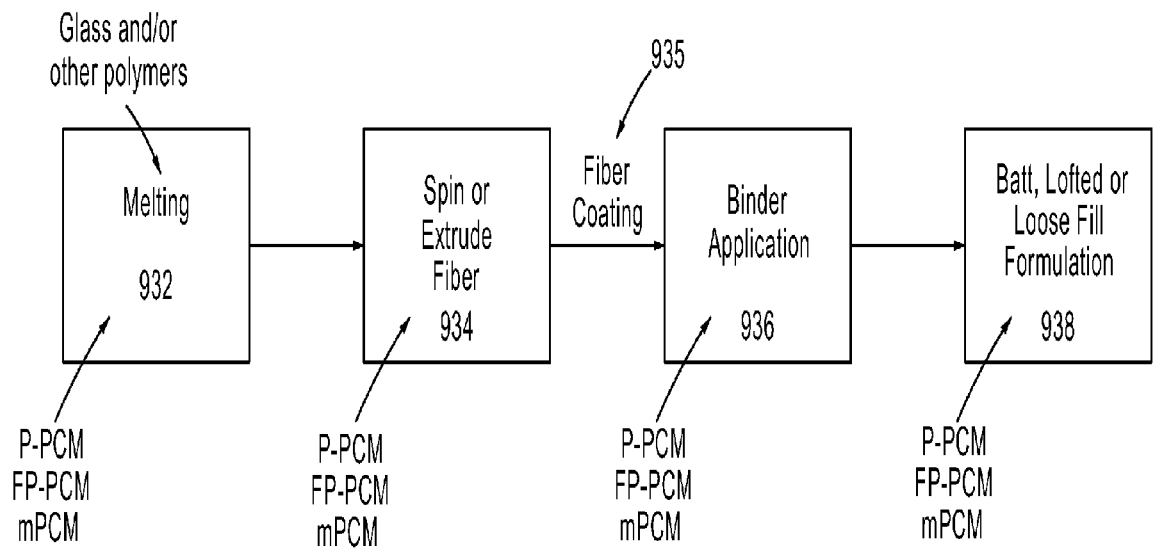
FIG. 11 shows a manufacturing process in accordance with various aspects of the present invention.
Figure 12:
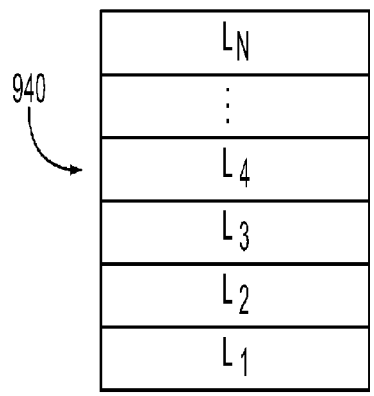
FIG. 12 shows the layering of the materials described herein as formed within articles constructed in accordance with aspects of the present invention.

FIG. 11 shows a process flow 930 for insulation fiber production that can apply to either batting or loose fill insulation materials. As shown in the example of FIG. 11, the PCM material (either P, F, or M as described above) can be added at any stage of the manufacturing process. At step 932 glass or another polymer base material is added to a melting process which is then spun or extruded at step 934. After a cooling step 935, a binder is applied at step 936 and then the material is formed into the batting or loose fill at 938. Depending on the preference for the end product, the PCM material (either P-PCM, FP-PCM and/or mPCM) can be added at any of the steps 932, 934, 936 or 938. As shown in FIG. 12, an insulation material made from various layers $L_1$-$L_N$ can include the PCM at any point throughout the layered structure 940 and can be distributed in a homogeneous or discontinuous manner.

Figure 13A:
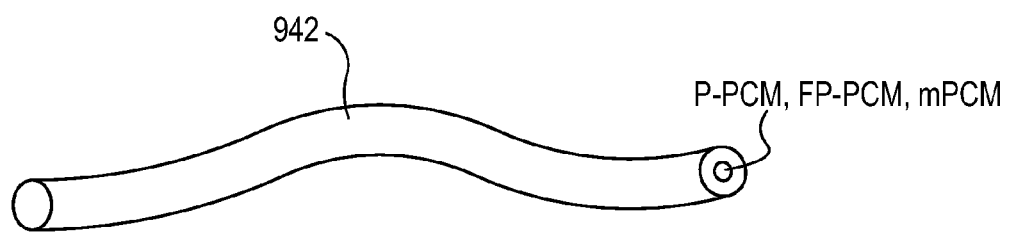
FIGS. 13A, 13B, and 14 show several examples of fiber construction in accordance with aspects of the present invention.
Figure 13B:
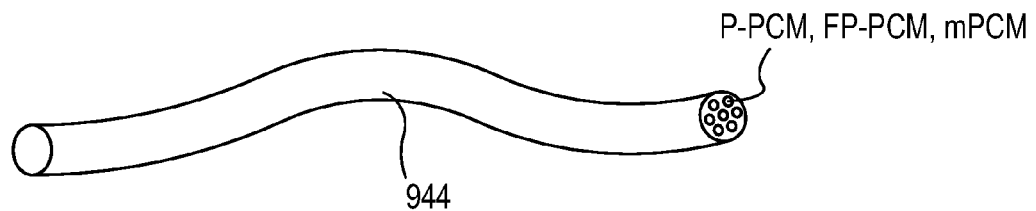
Figure 14:
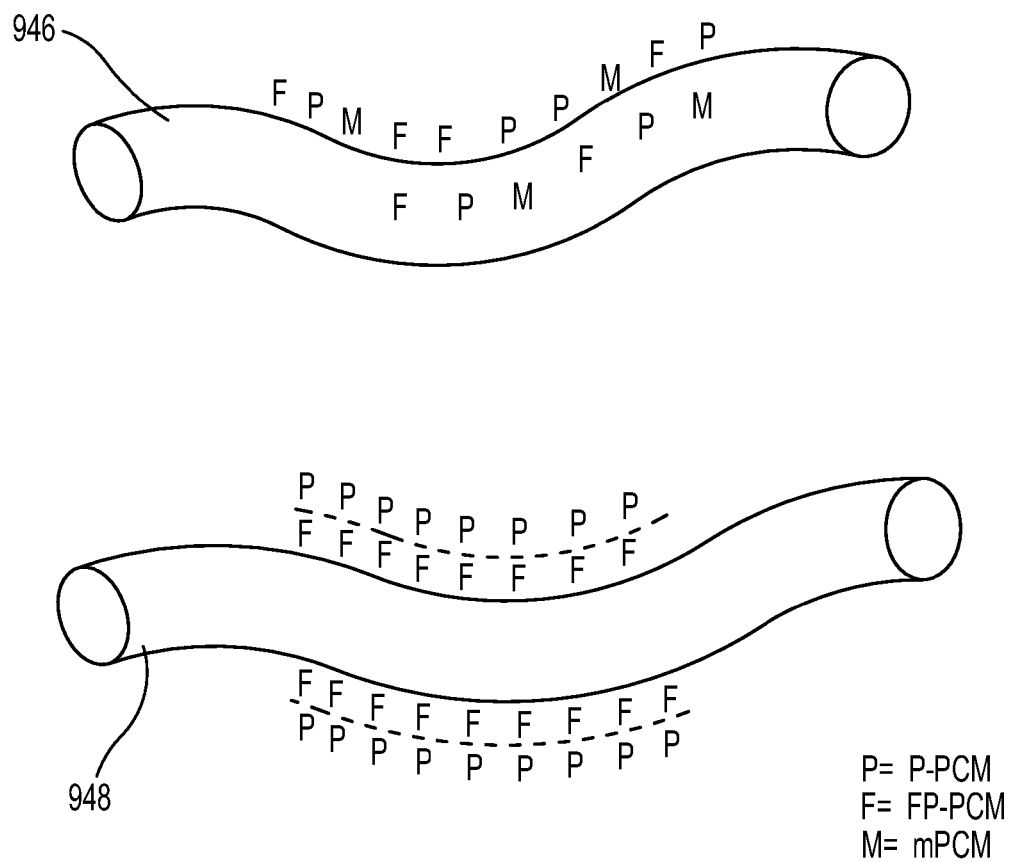
Figure 15:
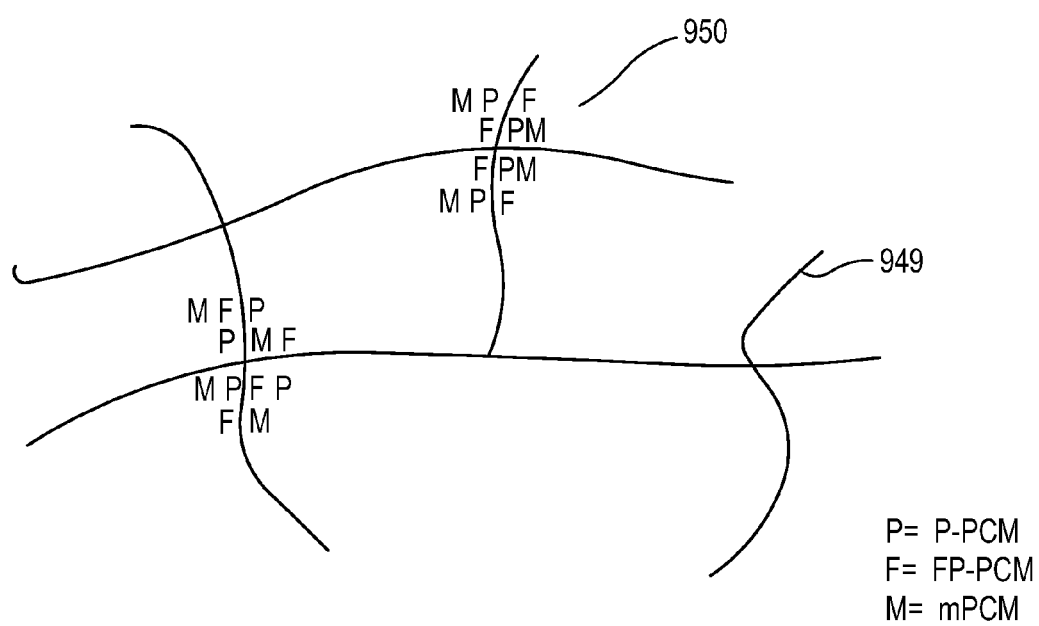
FIG. 15 shows various fibers bound together in accordance with aspects of the present invention.

FIGS. 13-15 show the various ways the PCM material may be incorporated into a fiber, fabric or other base material. FIGS. 13A and 13B shows the PCMs either dispersed in the fiber structure itself (13A) or formed into a multi-component fiber (13B) with a plurality of elongated members dispersed within the fiber body. FIG. 14 illustrates examples of the various types of PCMs described above incorporated onto the surface of the fibers. In these examples the PCMs can be a mixture of the different types of PCMs or as a layered application on the surface of the fiber. For example, an FP-PCM can be first applied as a part of a binder or adhesive and then mPCMs can be added and held on by the FP-PCM/binder mixture. FIG. 15 illustrates the various types of PCMs accumulated at the fiber interstices. In the embodiment of FIG. 15, the PCM material may cover all or a portion of the fiber 949 and may be included at the fiber boundaries or at the fiber junctions 950 to aid in bonding the fibers together in a web.

Figure 16:
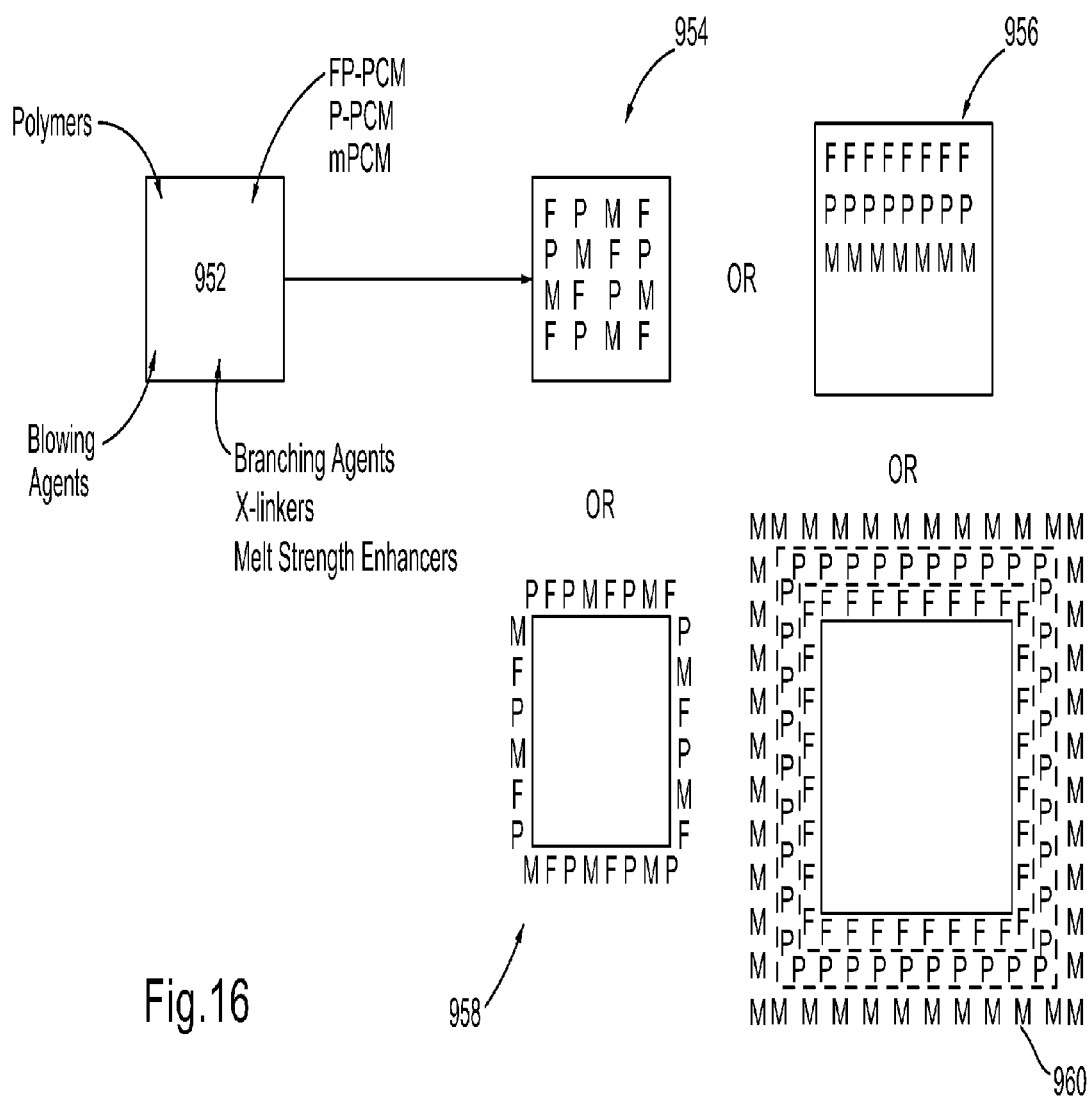
FIG. 16 shows an alternate manufacturing process in accordance with aspects of the present invention.

FIG. 16 is a flow chart illustrating various embodiments of a manufacturing process for block, slab, molded or blown foam insulation that incorporates the PCM materials described above. As a general proposition, FIG. 16 illustrates that the PCM material may be added at any point in the manufacture of the insulation material. Step 952 illustrates that PCM materials may be added during the initial mixing of all insulation ingredients (e.g. polymers, blowing agents, branching agents, cross-linking agents, melt strength enhancers, etc.) so that the PCM materials are with the foam. The resulting foam product may have the PCM material as a homogeneous or discontinuous mixture (954) or as a layered component (956). PCM material within the foam may also form discrete domains within the foam product. Finally, the PCM material may be applied to the surface of the foam in either a homogeneous or nonhomogeneous layer as shown in 958 and 960.

Figure 17:
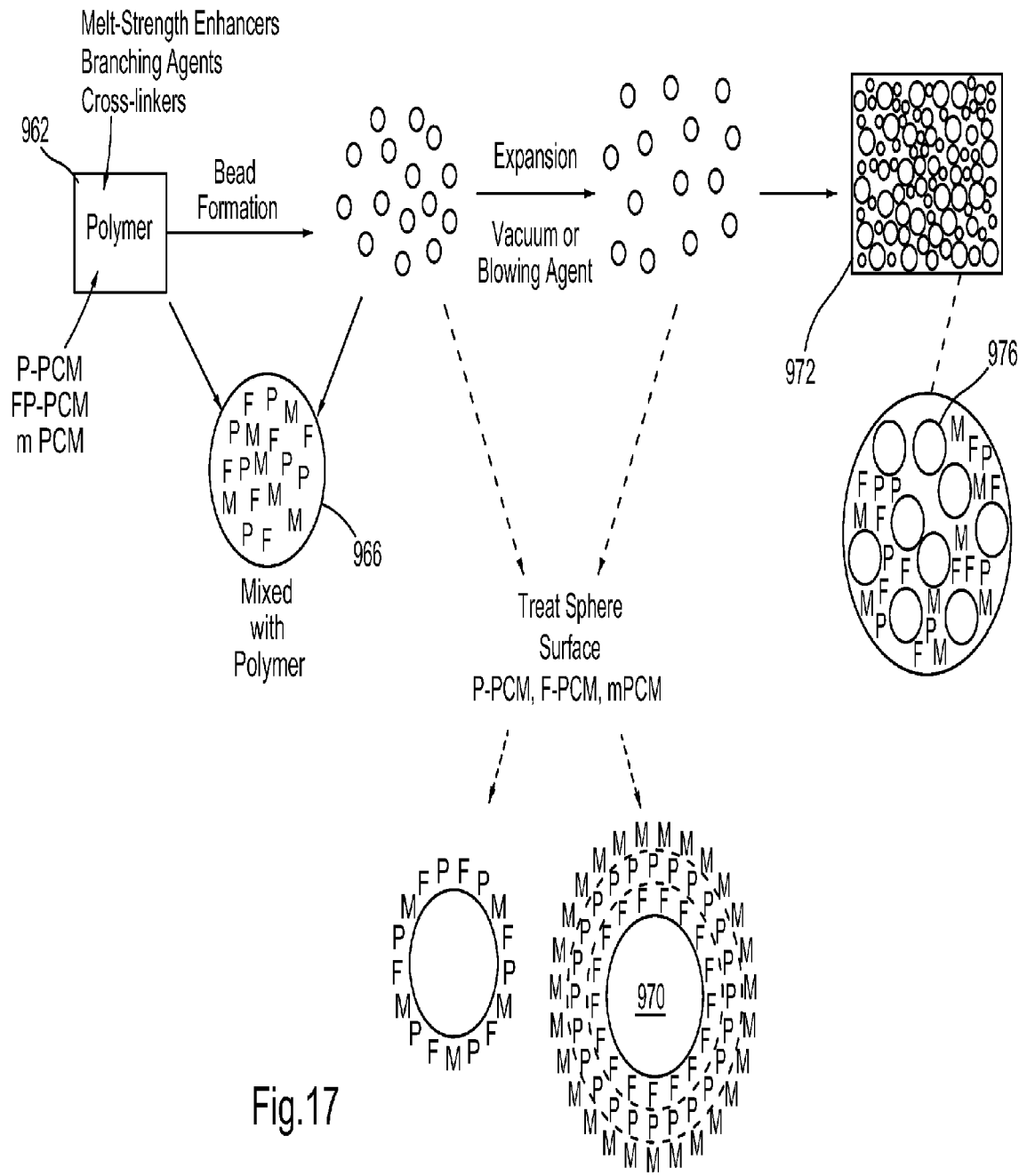
FIG. 17 shows another alternate manufacturing process in accordance with aspects of the present invention.

FIG. 17 shows various examples of expanded polymer sphere foams and a flow chart showing the ability to add PCM material at any stage of the manufacturing process of such materials. At step 962 a polymer material is used to form beads or spheres at step 964. The polymer beads can be mixed with a P-PCM or FP-PCM at 966. In addition branching agents, cross-linkers and other enhancers can be added to the polymer at step 962. The spheres are expanded at a vacuum or blowing step 968 at which point they may alternatively be coated with a P-PCM, FP-PCM or a mPCM at 970. The treated and expanded spheres are then formed into a block, slab or board at step 972. As shown in exploded view 974, the spheres 976 that form the slab insulation form interstices which may also accommodate additional P-PCM, FP-PCM or mPCM material.

Figure 18:
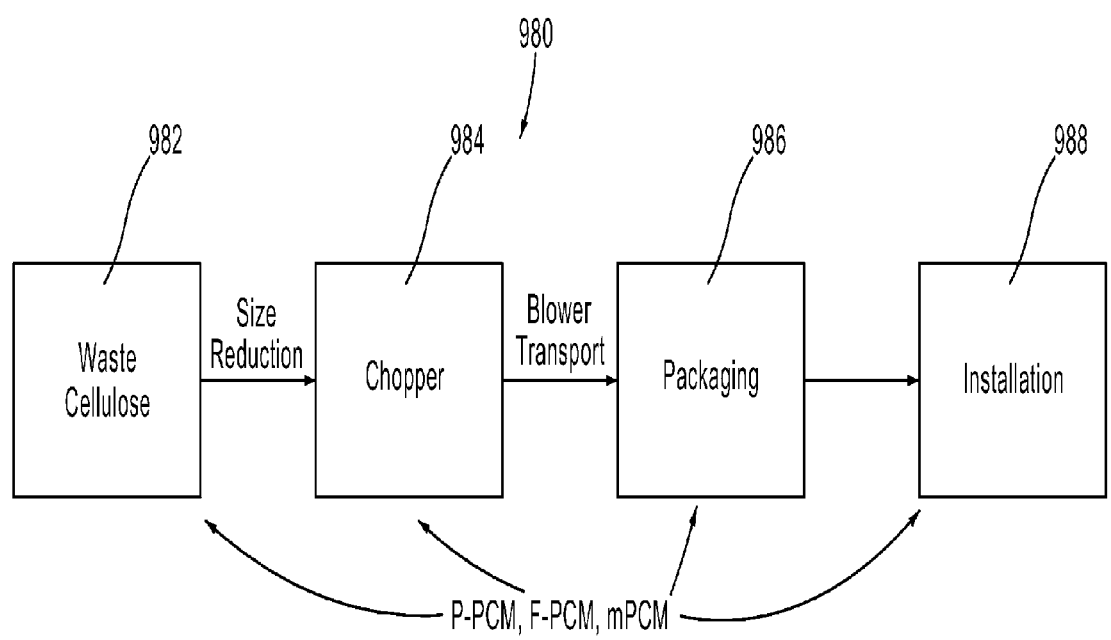
FIG. 18 shows another alternate manufacturing process in accordance with aspects of the present invention.

FIG. 18 is a general flow chart showing a process 980 of producing cellulose or another type of loose fill insulation. The addition of a P-PCM, FP-PCM or mPCM can happen at any of the points during the manufacturing process, including the point of acquiring waste cellulose 982, size reduction and chopping step 984, packaging step 986 and the installation step 988.

Other building products and components that may be used in connection with aspects of the present invention include:
1. Roll, blanket or batting insulation made of fiberglass, mineral (rock or slag) wool, natural minerals such as vermiculite or perlite, plastic or synthetic fibers (polyester, polypropylene, polyethylene, nylon, etc.) and natural fibers such as cellulose, wool, fur, cotton, straw, hemp or blends of various fibers.

2. Foam beads, board, blocks or liquid foam such as polystyrene, polyisocyanurate or polyiso, or polyurethane.
3. Loose-fill and/or blow-in insulation such as polystyrene beads, fiberglass, cellulose or mineral (rock or slag) wool.
4. Spray-on, foamed or foam-in-place insulation such as cementitious, phenolic, polyisocyanurate, or polyurethane.
5. Structural insulated panels (SIPs) such as foam board.

Foam insulation can be provided in many forms such as foamboard or beadboard, blocks, or bead type loose fill. The foam can be manufactured from any thermoset or thermoplastic material. For example, polystyrene such as beads, expanded beads, molded expanded polystyrene (MEPS), expanded polystyrene (EPS), extruded polystyrene (XPS), and expanded polystyrene foam (EPF).

The foams can be closed cell or open cell. Foam densities can be 0.1 $lb/ft^3$-10 $lb/ft^3$, preferably 0.2-5.0. providing R-values of 1-130. The closed cells can be filled with any gas such as air, nitrogen, carbon dioxide, inert gases such as argon, helium, etc. CFCs or HCFC all of which can be used as blowing agents. Aspects of the P-PCM and FP-PCM materials described herein can be used in connection with any of the above described products and their associated manufacturing processes. Details relating to the EPF manufacturing process are described below.

EPF (Expanded Polystyrene Foam) Manufacturing process—First, the beads of polystyrene must be expanded to achieve the proper density. This process is known as pre-expansion, and involves heating the polystyrene either with steam (the most common method) or hot air (for high density foam, such as that used for a coffee cup). The heating is carried out in a vessel holding anywhere from 50 to 500 gallons (189 to 1,892 liters). During pre-expansion, an agitator is used to keep the beads from fusing together. Since expanded beads are lighter than unexpanded beads, they are forced to the top of the vessel's cavity and discharged. This process lowers the density of the beads to three percent of their original value and yields a smooth-skinned, closed cell EPF that is excellent for detailed molding. Next, the pre-expanded beads are usually "aged" for at least 24 hours in mesh storage silos. This allows air to diffuse into the beads, cooling them and making them harder. After aging, the beads are fed into a mold of the desired shape. Low-pressure steam is then injected into and between the beads, expanding them once more and fusing them together. The mold is then cooled, either by circulating water through it or by spraying water on the outside. EPF is such a good insulator that it is hard to cool the mold down. Using small molds can reduce both the heating and cooling time and thereby speed up the process. This process yields EPF with small cell size that can be used to manufacture boards used for insulation. The beads are melted, and a blowing agent is added. The molten polystyrene is then extruded into the proper shape under conditions of high temperature and pressure.

P-PCMs and FP-PCMs as disclosed herein can be used in conjunction with expanded polystyrene foam by coating the beads or integrating the material into the beads during their initial manufacturing as described above. The P-PCM and FP-PCM materials can be used to bind or improve the binding of the beads. The P-PCM and FP-PCM materials described herein can also be combined with other mPCM materials and then bind the mPCM to the beads.

The loose fill insulation can be in the form of fibers, flakes, powders, granules and/or nodules of various materials. The loose fill insulation is of the type for insulating an interior of a hollow or open space in a building structure, e.g., a house, office, or other building structure. Preferably, the loose fill can be compressed during storage to save space, and then expanded or "fluffed-up" with air or another gas when poured or blown into a hollow wall or other empty space of a structure. The loose fill can include organic materials, inorganic materials or both. Examples of organic loose fill materials include animal fibers, such as wool, cellulose-containing vegetable fibers, such as cotton, rayon, granulated cork (bark of the cork tree), redwood wool (fiberized bark of the redwood tree), and recycled, shredded or ground newspaper fibers, and thermoplastic polymer fibers, such as polyester; and expanded plastic beads. Examples of inorganic loose fill materials include diatomaceious silica (fossilized skeletons of microscopic organisms), perlite, fibrous potassium titanate, alumina-silica fibers, microquartz fibers, opacified colloidal alumina, zirconia fibers, alumina bubbles, zirconia bubbles, carbon fibers, granulated charcoal, cement fibers, graphite fibers, rock fibers, slag fibers, glass wool and rock wool. The loose fill can include one or more varieties of loose fill material.

Synthetic fiber or glass fiber insulation can take many forms and shapes. The fiber body of the insulation will typically will be elongated and may have a length that is several times (e.g., 100 times or more) greater than its diameter. The fiber body may have a variety of regular or irregular cross sectional shapes such as, by way of example and not by limitation, circular, multi-lobal, octagonal, oval, pentagonal, rectangular, square-shaped, trapezoidal, triangular, wedge-shaped, and so forth. According to some embodiments of the invention, two or more of the elongated members (e.g., two adjacent elongated members) may be joined, combined, united, or bonded to form a unitary fiber body.

For instance, the fiber can be hollow to provide dead air space in the interstices of the fiber to provide improved insulation. The fiber can be made from two different materials which when combined during manufacture, fuse together and as the material cools, annealed, drawn, stretched or otherwise treated—the fibers form random curls or crimps. This material maybe less irritating, safer to work with, require no chemical binder due to inter and intra-locking of the fiber strands to hold loft. Examples are side-by-side or eccentric core sheath fibers of which the two different materials can be different viscosities, different crystallinity, different materials, organic/inorganic or combinations thereof.

Additives such as coupling, crosslinking, compatabiliztation, nucleation, crystallization, foaming agents, anti-mold, anti-mildew, anti-odor, etc. can be added to the materials to improve the properties of the insulation materials such as, by way of example and not by limitation, water, surfactants, dispersants, anti-foam agents (e.g., silicone containing compounds and fluorine containing compounds), antioxidants (e.g., hindered phenols and phosphites), thermal stabilizers (e.g., phosphites, organophosphorous compounds, metal salts of organic carboxylic acids, and phenolic compounds), light or UV stabilizers (e.g., hydroxy benzoates, hindered hydroxy benzoates, and hindered amines), microwave absorbing additives (e.g., multifunctional primary alcohols, glycerine, and carbon), reinforcing fibers (e.g., carbon fibers, aramid fibers, and glass fibers), conductive fibers or particles (e.g., graphite or activated carbon fibers or particles), lubricants, process aids (e.g., metal salts of fatty acids, fatty acid esters, fatty acid ethers, fatty acid amides, sulfonamides, polysiloxanes, organophosphorous compounds, silicon containing compounds, fluorine containing compounds, and phenolic polyethers), fire retardants (e.g., halogenated compounds, phosphorous compounds, organophosphates, organobromides, alumina trihydrate, melamine derivatives, magnesium hydroxide, antimony compounds, antimony oxide, and boron compounds), anti-blocking additives (e.g., silica, talc, zeolites, metal carbonates, and organic polymers), anti-fogging additives (e.g., non-ionic surfactants, glycerol esters, polyglycerol esters, sorbitan esters and their ethoxylates, nonyl phenyl ethoxylates, and alcohol ethyoxylates), anti-static additives (e.g., non-ionics such as fatty acid esters, ethoxylated alkylamines, diethanolamides, and ethoxylated alcohol; anionics such as alkylsulfonates and alkylphosphates; cationics such as metal salts of chlorides, methosulfates or nitrates, and quaternary ammonium compounds; and amphoterics such as alkylbetaines), anti-microbials (e.g., arsenic compounds, sulfur, copper compounds, isothiazolins phthalamides, carbamates, silver base inorganic agents, silver zinc zeolites, silver copper zeolites, silver zeolites, metal oxides, and silicates), crosslinkers or controlled degradation agents (e.g., peroxides, azo compounds, and silanes), colorants, pigments, dyes, fluorescent whitening agents or optical brighteners (e.g., bis-benzoxazoles, phenylcoumarins, and bis-(styryl)biphenyls), fillers (e.g., natural minerals and metals such as oxides, hydroxides, carbonates, sulfates, and silicates; talc; clay; wollastonite; graphite; carbon black; carbon fibers; glass fibers and beads; ceramic fibers and beads; metal fibers and beads; flours; and fibers of natural or synthetic origin such as fibers of wood, starch, or cellulose flours), coupling agents (e.g., silanes, titanates, zirconates, fatty acid salts, anhydrides, epoxies, and unsaturated polymeric acids), reinforcement agents, crystallization or nucleation agents (e.g., any material which increases or improves the crystallinity in a polymer, such as to improve rate/kinetics of crystal growth, number of crystals grown, or type of crystals grown), and so forth. A more complete list of additives can be found in "Plastics Additives Handbook" $5^{th}$ edition, Hanser Publishers.

Other products and materials that may benefit from the use of P-PCMs and FP-PCMs include:
1. Electronics and electrical articles such as conductors, heat sinks, semiconductors, transistors, integrated circuits, wiring, switches, capacitors, resistors, diodes, boards, coverings, motors, engines, etc.
2. Articles for use in industries such as automotive, heavy equipment, trucking, food/beverage delivery, cosmetics, civil service, agriculture, hunting/fishing, manufacturing, etc. which incorporate articles described above.
3. Cosmetics such as creams, lotions, shampoos, conditioners, bodywash, soaps, hair gels, mousse, lipstick, deodorant, moisturizers, nail polish, glosses, lipsticks, makeup, eyeliners/eyeshadow, foundations, blushes, mascara, etc.
4. Controlled release articles in which the FP-PCM creates a barrier when in one phase and allows movement when in another phase.

The barrier described above can be due to trapping of the material within the FP-PCM crystalline domain matrix or physical layers between the materials, etc. This phase shift to change the barrier characteristics can be triggered by energy such as light, UV, IR, heat, thermal, plasma, sound, microwave, radiowave, pressure, x-ray, gamma, or any form of radiation or energy. The barrier can prevent movement of or release of such as materials, colors or energy. A further example is a barrier to liquid materials or the blocking/unblocking of light or color, the change of stiffness or flexibility at various temperatures, etc. Further examples are the containment/release of catalysts, chemical reaction control agents (increase or decrease reaction), adhesion, enzymes, dyes, colors, stabilizers for or against light and/or temperature, nano or microparticles, temperature or fraud markers, etc.

In addition, the FP-PCM can be incorporated into articles as outlined in the following commonly assigned patents: For coating, such as in U.S. Pat. No. 5,366,801, Fabric with Reversible Enhanced Thermal Properties; U.S. Pat. No. 6,207,738, Fabric Coating Composition Containing Energy Absorbing Phase Change Material; U.S. Pat. No. 6,503,976, Fabric Coating Composition Containing Energy Absorbing Phase Change Material and Method of Manufacturing Same; U.S. Pat. No. 6,660,667, Fabric Coating Containing Energy Absorbing Phase Change Material and Method of Manufacturing Same; U.S. Pat. No. 7,135,424, Coated Articles Having Enhanced Reversible Thermal Properties and Exhibiting Improved Flexibility, Softness, Air Permeability, or Water Vapor Transport Properties; U.S. application Ser. No. 11/342,279, Coated Articles Formed of Microcapsules with Reactive Functional Groups.

For Fibers such as in U.S. Pat. No. 4,756,958, Fiber with Reversible Enhanced Thermal Storage Properties and Fabrics Made Therefrom; U.S. Pat. No. 6,855,422, Multi-Component Fibers Having Reversible Thermal Properties; U.S. Pat. No. 7,241,497, Multi-Component Fibers Having Reversible Thermal Properties; U.S. Pat. No. 7,160,612, Multi-Component Fibers Having Reversible Thermal Properties; U.S. Pat. No. 7,244,497, Cellulosic Fibers Having Enhanced Reversible Thermal Properties and Methods of Forming Thereof.

For Fibers, laminates, extruded sheet/film or molded goods, such as in U.S. Pat. No. 6,793,85, Melt Spinable Concentrate Pellets Having Enhanced Reversible Thermal Properties; U.S. application Ser. No. 11/078,656, Polymeric composites having enhanced reversible thermal properties and methods of forming thereof; PCT App. No. PCT/US07/71373, Stable Suspensions Containing Microcapsules and Methods for Preparation Thereof.

These embodiments and articles can be used in any application where temperature regulation, temperature buffering, temperature control or latent heat of fusion is utilized, or any phase transition phenomenon is employed. These applications may or may not be used in conjunction with hydrophilic properties, hydrophobic properties, moisture absorbing, moisture releasing, organic materials absorption or release, inorganic materials absorption or release, crosslinking, anti-microbial, anti-fungal, anti-bacterial, biodegradability, decomposition, anti-odor, odor controlling, odor releasing, grease and stain resistance, stabilization for oxidation or ageing, fire retardant, anti-wrinkle, enhanced rigidity or flexibility, UV or IR screening, impact resistance or control, color addition, color change, color control, catalytic or reaction control, sound, light, optical, static or energy management, surface tension, surface smoothness, or surface properties control, anti-fraud or brand marking control, controlled release/containment, or controlled barrier properties, etc. Any of the above additional properties may be utilized in the building material and construction components embodiments described herein. For example, anti-fungal and/or moisture management properties can be added to the temperature regulating properties to further enhanced the performance properties of the substrate or other material.

In accordance with another aspect a method is provided for the production of an article described herein, comprising providing a FP-PCM, providing a substrate and combining the FP-PCM with the substrate. According to one embodiment, the substrate carries at least one reactive function and the combining comprises chemically reacting a functional group of the FP-PCM with a functional group of the substrate.

According to another aspect, a precursor for the production of the article is provided, which precursor comprises a functional polymeric phase change material and at least one other ingredient.

According to another aspect, a method for the production of the article comprises providing a precursor, providing a substrate, and combining the FP-PCM of the precursor with the substrate. The substrate may carry at least one reactive function. Combining the FP-PCM of the precursor with the substrate comprises chemically reacting a functional group of the FP-PCM with a functional group of the substrate.

The selection of a material forming the substrate may be dependent upon various considerations, such as its affinity to the FP-PCM, its ability to reduce or eliminate heat transfer, its breathability, its drapability, its flexibility, its softness, its water absorbency, its film-forming ability, its resistance to degradation under ambient or processing conditions, and its mechanical strength. In particular, for certain implementations, a material forming the substrate can be selected so as to include a set of functional groups, such as acid anhydride groups, aldehyde groups, amino groups, N-substituted amino groups, carbonyl groups, carboxy groups, epoxy groups, ester groups, ether groups, glycidyl groups, hydroxy groups, isocyanate groups, thiol groups, disulfide groups, silyl groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), or combinations thereof. At least some of these functional groups can be exposed on a top surface of the substrate and can allow chemical bonding to a set of complementary functional groups included in the embodiments and additives, thereby enhancing durability of the article during processing or during use. Thus, for example, the substrate can be formed of cellulose and can include a set of hydroxy groups, which can chemically bond to a set of carboxy groups included in the FP-PCM. As another example, the substrate can be a proteinacous material and can be formed of silk or wool and can include a set of amino groups, which can chemically bond to those carboxy groups included in the FP-PCM. As can be appreciated, chemical bonding between a pair of functional groups can result in the formation of another functional group, such as an amide group, an ester group, an ether group, an urea group, or an urethane group. Thus, for example, chemical bonding between a hydroxy group and a carboxy group can result in the formation of an ester group, while chemical bonding between an amino group and a carboxy group can result in the formation of an amide group.

In the building material and construction component market, the selection of the substrate or underlying base material is tied initially to the specific nature of the material. For example, exterior construction materials may benefit from moisture management, anti-fungal or ultraviolet blocking additives. Interior construction materials such as wallboard and paneling may not need functions such as U/V protection, but may still benefit from anti-microbial and anti-fungal properties.

For certain implementations, a material forming the substrate can initially lack a set of functional groups, but can be subsequently modified so as to include those functional groups. In particular, the substrate can be formed by combining different materials, one of which lacks a set of functional groups, and another one of which includes those functional groups. These different materials can be uniformly mixed or can be incorporated in separate regions or separate sub-layers. For example, the substrate can be formed by combining polyester fibers with a certain amount (e.g., 25 percent by weight or more) of cotton or wool fibers that include a set of functional groups. The polyester fibers can be incorporated in an outer sub-layer, while the cotton or wool fibers can be incorporated in an inner sub-layer, adjacent to other layers. As another example, a material forming the substrate can be chemically modified so as to include a set of functional groups. Chemical modification can be performed using any suitable technique, such as using oxidizers, corona treatment, or plasma treatment. Chemical modification can also be performed as described in the patent of Kanazawa, U.S. Pat. No. 6,830,782, entitled "Hydrophilic Polymer Treatment of an Activated Polymeric Material and Use Thereof," the disclosure of which is incorporated herein by reference in its entirety. In some instances, a material forming the substrate can be treated so as to form radicals that can react with monomers including a set of functional groups. Examples of such monomers include those with anhydride groups (e.g., maleic anhydride), those with carboxy groups (e.g., acrylic acid), those with hydroxy groups (e.g., hydroxylethyl acrylate), and those with epoxy or glycidyl groups (e.g., glycidyl methacrylate). In other instances, a material forming the substrate can be treated with a set of functional materials to add a set of functional groups as well as to provide desirable moisture management properties. These functional materials can include hydrophilic polymers, such as polyvinyl alcohol, polyglycols, polyacrylic acid, polymethacrylic acid, hydrophilic polyesters, and copolymers thereof. For example, these functional materials can be added during a fiber manufacturing process, during a fabric dyeing process, or during a fabric finishing process. Alternatively, or in conjunction, these functional materials can be incorporated into a fabric via exhaust dyeing, pad dyeing, or jet dyeing.

The FP-PCM can be implemented as a coating, laminate, infusion, treatment or ingredient in a coating, laminate, infusion, treatment that is formed adjacent to, on or within the substrate using any suitable coating, laminating, infusion, etc. technique. During use, the FP-PCM can be positioned so that it is adjacent to an internal compartment or an individual's skin, thus serving as an inner coating. It is also contemplated that the FP-PCM can be positioned so that it is exposed to an outside environment, thus serving as an outer coating. The FP-PCM covers at least a portion of the substrate. Depending on characteristics of the substrate or a specific coating technique that is used, the FP-PCM can penetrate below the top surface and permeate at least a portion of the substrate. While two layers are described, it is contemplated that the article can include more or less layers for other implementations. In particular, it is contemplated that a third layer can be included so as to cover at least a portion of a bottom surface of the substrate. Such a third layer can be implemented in a similar fashion as the FP-PCM or can be implemented in another fashion to provide different functionality, such as water repellency, stain resistance, stiffness, impact resistance, etc.

In one embodiment, the FP-PCM is blended with a binder which may also contain a set of microcapsules that are dispersed in the binder. The binder can be any suitable material that serves as a matrix within which the FP-PCM and possibly also the microcapsules are dispersed, thus offering a degree of protection to the FP-PCM and microcapsules against ambient or processing conditions or against abrasion or wear during use. For example, the binder can be a polymer or any other suitable medium used in certain coating, laminating, or adhesion techniques. These techniques are particularly applicable and beneficial to materials used in building materials and construction components due to the overall makeup of products such as siding, roofing, lumber, glass panels, etc. For certain implementations, the binder is desirably a polymer having a glass transition temperature ranging from about −110° C. to about 100° C., more preferably from about −110° C. to about 40° C. While a polymer that is water soluble or water dispersible can be particularly desirable, a polymer that is water insoluble or slightly water soluble can also be used as the binder for certain implementations.

The selection of the binder can be dependent upon various considerations, such as its affinity for the FP-PCM and/or microcapsules or the substrate, its ability to reduce or eliminate heat transfer, its breathability, its drapability, its flexibility, its softness, its water absorbency, its coating-forming ability, its resistance to degradation under ambient or processing conditions, and its mechanical strength. In particular, for certain implementations, the binder can be selected so as to include a set of functional groups, such as acid anhydride groups, amino groups and their salts, N-substituted amino groups, amide groups, carbonyl groups, carboxyl groups and their salts, cyclohexyl epoxy groups, epoxy groups, glycidyl groups, hydroxyl groups, isocyanate groups, urea groups, aldehyde groups, ester groups, ether groups, alkenyl groups, alkynyl groups, thiol groups, disulfide groups, silyl or silane groups, groups based on glyoxals, groups based on aziridines, groups based on active methylene compounds or other b-dicarbonyl compounds (e.g., 2,4-pentandione, malonic acid, acetylacetone, ethylacetone acetate, malonamide, acetoacetamide and its methyl analogues, ethyl acetoacetate, and isopropyl acetoacetate), halo groups, hydrides, or other polar or H bonding groups and combinations thereof.

These functional groups can allow chemical bonding to a complementary set of functional groups included in either of, or any of, the FP-PCM, the microcapsules and the substrate, thereby enhancing durability of the article during processing or during use. Thus, for example, the binder can be a polymer that includes a set of epoxy groups, which can chemically bond to a set of carboxy groups included in the FP-PCM and/or the microcapsules. As another example, the binder can be a polymer that includes a set of isocyanate groups or a set of amino groups, which can chemically bond with those carboxy groups included in the FP-PCM, microcapsules, or substrate.

In some instances, a set of catalysts can be added when forming the coating composition. Such catalysts can facilitate chemical bonding between complementary functional groups, such as between those included in the binder and those included in the microcapsules. Examples of materials that can be used as catalysts include boron salts, hypophosphite salts (e.g., ammonium hypophosphite and sodium hypophosphite), phosphate salts, tin salts (e.g., salts of $Sn^{+2}$ or $Sn^{+4}$, such as dibutyl tin dilaurate and dibutyl tin diacetate), and zinc salts (e.g., salts of $Zn^{+2}$). A desirable amount of a tin salt or a zinc salt that is added to the coating composition can range from about 0.001 to about 1.0 percent by dry weight, such as from about 0.01 to about 0.1 percent by dry weight. A desirable amount of a boron salt or a phosphate salt that is added to the coating composition can range from about 0.1 to about 5 percent by dry weight, such as from about 1 to about 3 percent by dry weight. Other examples of materials that can be used as catalysts include alkylated metals, metal salts, metal halides, and metal oxides, where suitable metals include Sn, Zn, Ti, Zr, Mn, Mg, B, Al, Cu, Ni, Sb, Bi, Pt, Ca, and Ba. Organic acids and bases, such as those based on sulfur (e.g., sulfuric), nitrogen (e.g., nitric), phosphorous (e.g., phosphoric), or halides (e.g., F, Cl, Br, and I), can also be used as catalyst. Further examples of materials that can be used as catalysts include acids such as citric acid, itaconic acid, lactic acid, fumaric acid, and formic acid.

Bonds between substrate, functional phase change material, binder and/or microcapsules are, according to various embodiments, covalent, electrovalent or various combinations of those. Binding could be direct or indirect, e.g. via a connecting compound. According to some embodiments, the connecting compound is selected from a group consisting of functional polymeric phase change material and microcapsules. According to another embodiment, the functional polymeric phase change material forms a binder for at least a portion of a second PCM.

According to another embodiment, the reactive function of the FP-PCM can be converted into another reactive function, which is more suitable for reacting with particular substrates.

According to another embodiment, the reactive function of the FP-PCM could be of various chemical nature. For example, reactive functions capable of reacting and forming covalent or electrovalent bonds with reactive functions of various substrates, e.g. cotton, wool, fur leather, polyester and textiles made from such materials.

According to another embodiment of the invention, the reactive function can be any of the following: 1) glycidyl or epoxy such as from glycidyl methacrylate or glycidyl vinyl ether; 2) anhydride such as from maleic anhydride or itaconic anhydride; 3) isocyanate such as from isocyanato methacrylate, TMI® from Cytec Ind. or blocked isocyanates such as 240-[1'-methylproplyideneamino]carboxyamino)ethyl methacrylate; 4) amino or amine-formaldehyde such as from N-methylolacrylamide; and 5) silane such as from methacryloxypropyltriethoxysilane. Such reactive functions can react with OH functional groups of cellulosic based textiles such as cotton; with amine functional groups of proteinaceous based textiles such as wool, fur or leather; with hydroxyl or carboxyl groups of polyester based textiles and with amide functional groups of nylon functional resins.

According to still another embodiment of the invention, the reactive function is a double bond, capable of binding to another double bond, providing a cross-linking point, etc.

The reactive function of the FP-PCM can assume a positive charge and bind electrovalently with a negative charge on the substrate. According to another embodiment, the reactive function can assume a negative charge and bind electrovalently with a positive charge on the substrate. According to another embodiment, the reactive functions of both the substrate and the FP-PCM and/or microcapsule are negatively charged and binding is via a multivalent cation, which acts as a cross-linker. According to still another embodiment, the reactive functions of both the substrate and the FP-PCM and/or microcapsule are positively charged and binding is via a multivalent anion, which acts as a cross-linker. The cross-linking multivalent cation, anion or both could be organic or inorganic.

An article constructed in accordance with various aspects of the present invention can have a single phase change temperature or multiple phase change temperatures, e.g. in cases wherein the FP-PCM has multiple types of crystallizable sections or cases wherein the article comprises multiple FP-PCMs of different types.

An article constructed in accordance with aspects of the present invention has at least one phase change temperature in the range between −10° C. and 100° C., preferably between 10° C. and 60° C. and phase change enthalpy of at least 2.0 Joules/gram (J/g) or 10 $J/m^2$. According to other embodiments, the functional polymeric phase change material comprises hydrophilic crystallizable section, hydrophobic crystallizable section or both. As example, an AB block copolymer, made of segments such as polystearyl methacrylate and polyethylene glycol methacrylate would have two different phase change temperatures and hydrophilic/hydrophobic properties. One phase change temperature from the stearyl hydrophobic crystallizable side chains and another phase change temperature from the glycol hydrophilic crystallizable side chains.

The phase change at each of the temperatures has its own enthalpy, so that the article has according to some of the embodiments a single phase change enthalpy and, according to others, multiple such enthalpies. According to an embodiment of the invention, the article has an overall phase change enthalpy of at least 2.0 Joules/gram (J/g) or 10 J/m$^2$.

According to another aspect, the present invention provides a precursor for the production of an article according to the second aspect, which precursor comprises the functional polymeric phase change material and at least one other ingredient. The one other ingredient is selected from a group consisting of an organic solvent, an aqueous solvent, another FP-PCM, another PCM, microcapsules comprising PCM, microcapsules with other additives, binders, crosslinkers, blending polymers, compatibilizers, wetting agents, catalysts and additives. and their combinations. Examples of precursors are formulations used for the coating, dyeing, dipping, spraying, brushing, padding, printing, etc. of substrates, the predispersion of FP-PCMs for addition to manufacturing lines such as injecting into fiber dope on spin lines, Colorant and tint formulations, additive masterbatches or dispersions, neutralizing or pH adjusting solutions, the formulation of plastic pellets or masterbatches for extrusion and formation of melt spun fibers, molded parts, film, sheets or laminated products. These are described in cited and included Outlast patents and applications above.

According to another embodiment, a method is provided for the production of an article, comprising providing a precursor, providing a substrate and combining the FP-PCM of the precursor with the substrate. The substrate preferably carries at least one reactive function and combining the FP-PCM of the precursor with the substrate comprises chemically reacting a functional group of the FP-PCM with a functional group of the substrate.

Further examples of binders or crosslinkers are polymers, oligomers or molecules with multiple reactive functional groups which can interact or bond with another of the same, another FP-PCM, another PCM, microcapsules comprising PCM, microcapsules with other additives, binders, crosslinkers, blending polymers, compatibilizers, wetting agents, additives, etc. The bonds or interactions can be either covalent or ionic.

For certain implementations, a set of reactive components or modifiers can also be added when forming the composition. Such modifiers can allow cross-linking of the FP-PCM and/or binder to provide improved properties, such as durability and other properties. Examples of materials that can be used as modifiers include polymers, such as melamine-formaldehyde resins, urea-formaldehye resins, polyanhydrides, urethanes, epoxies, acids, polyurea, polyamines or any compound with multiple reactive functional groups. A desirable amount of a modifier that is added to the coating composition can range from about 1 to about 20 percent by dry weight, such as from about 1 to about 5 percent by dry weight. Also, a set of additives can be added when forming the composition. In some instances, these additives can be contained within the microcapsules. For examples of additives include those that improve water absorbency, water wicking ability, water repellency, stain resistance, dirt resistance, and odor resistance. Additional examples of additives include anti-microbials, flame retardants, surfactants, dispersants, and thickeners. Further examples of additives and modifiers are set forth below.

Moisture management, hydrophilic and polar materials—such as including or based on acids, glycols, salts, hydroxy group-containing materials (e.g., natural hydroxy group-containing materials), ethers, esters, amines, amides, imines, urethanes, sulfones, sulfides, natural saccharides, cellulose, sugars and proteins Grease, dirt and stain resistance—such as non-functional, non-polar, and hydrophobic materials, such as fluorinated compounds, silicon-containing compounds, hydrocarbons, polyolefins, and fatty acids.

Anti-microbial, Anti-fungal and Anti-bacterial—such as complexing metallic compounds based on metals (e.g., silver, zinc, and copper), which cause inhibition of active enzyme centers. copper and copper-containing materials (e.g., salts of Cu.+2 and Cu.+), such as those supplied by Cupron Ind., silver and silver-containing materials and monomers (e.g., salts of Ag, Ag.+, and Ag+2), such as supplied as ULTRA-FRESH by Thomson Research Assoc. Inc. and as SANI-TIZED Silver and Zinc by Clariant Corp. oxidizing agents, such as including or based on aldehydes, halogens, and peroxy compounds that attack cell membranes (e.g., supplied as HALOSHIELD by Vanson HaloSource Inc.) 2,4,4'-trichloro-2'-hydroxy dipenyl ether (e.g., supplied as TRICLOSAN), which inhibits growth of microorganisms by using an electrochemical mode of action to penetrate and disrupt their cell walls. quaternary ammonium compounds, biguanides, amines, and glucoprotamine (e.g., quaternary ammonium silanes supplied by Aegis Environments or as SANITIZED QUAT T99-19 by Clariant Corp. and biguanides supplied as PURISTA by Avecia Inc.) chitosan castor oil derivatives based on undecylene acid or undecynol (e.g., undecylenoxy polyethylene glycol acrylate or methacrylate).

For certain implementations, the layers can have a loading level of the FP-PCM alone or in combination with microcapsules ranging from about 1 to about 100 percent by dry weight, most preferably from about 10% to about 75%. These FP-PCM, binders, additives and microcapsules can differ from each other or be the same such as by being liquids or solids at room temperature, having different shapes or sizes, by including shells formed of a different material or including different functional groups, or by containing a different phase change material or a combination thereof.

According to another embodiment, an article comprises a substrate and a starch or modified starch. Starch is a polymer, mainly of glucose, has crystallizable sections and carries hydroxyl groups. As such it is suitable as an FP-PCM for use in articles constructed in accordance with aspects of the present invention. In most cases, starch consists of both linear and branched chains. Different starches comprise various degrees of crystallizable sections, as found e.g. in standard differential scanning calorimetry (DSC) analysis. The crystallizable section consists of aligning side chains on the branched starch. Temperature and elevation, optionally combined with increased moisture leads to decrystallization (which is sometimes referred to as gelatinization). At lower temperature (and moisture), recrystallization takes place. Starch is hydrophilic, and, as such, also provides both for extension of the temperature regulating capacity of the FP-PCM and for recharging of the FP-PCM. Another feature of using starch and its derivatives, as well as some other hydrophilic FP-PCMs is the ability to adjust its transition temperature by adjusting its moisture content. Typically, the higher the moisture, the lower is the transition temperature.

According to various embodiments of the invention, various natural starches may be used, including, but not limited to, corn starch, potato starch and wheat starch. According to other embodiments, modified starch may be used, e.g. starch modified specifically for the article of the present invention or commercially available, modified starch. According to further embodiments, such modified starch is a result of acid hydrolysis for lowering its molecular weight (e.g. acid thinning) and/or a result of separating a fraction of it for enrichment in one of amylase or amylopectin. According to other embodiments, the starch to be used as an FP-PCM is chemically modified by attaching to it a new reactive function. According to various other embodiments, the chemically-modified starch is selected from commercially-available, chemically modified starches prepared for applications such as the food industry, the paper industry and others, e.g. hydroxyethyl starch, hydroxypropyl starch, starch acetate, starch phosphate, starch, cationic starches, anionic starches and their combinations. Modified starches and methods of their production are described in Chapter 16 of Corn Chemistry and Technology, edited by Watson and Ramstad, published by American Association of Cereal Chemists Inc., the teaching of which is incorporated herein by reference.

In accordance with one aspect the starch or modified starch is bound to the substrate via a covalent bond. According to another aspect it is bound via an electrovalent bond. According to various other embodiments, the covalently bound starch is selected from a group consisting of natural starch, thinned starch, amylase-enriched starch, amylopectin-enriched starch, hydroxyethyl starch, hydroxypropyl starch, starch acetate, starch phosphate, starch, cationic starches, anionic starches and their combinations. According to other embodiments, the electro-valently bound starch is selected from a group consisting of starch acetate, starch phosphate, starch, cationic starches, anionic starches and their combinations.

An article constructed in accordance with one aspect of the present invention comprises a substrate and at least one of gelatin, gelatin solutions and modified gelatin. Gelatin is a polymer mainly containing repeating sequences of glycine-X-Y-triplets, where X and Y are frequently proline and hydroxyproline amino acids. These sequences are responsible for the triple helical structure of gelatins and their ability to form thermally and reversible gels.

The formation of these phase changing structures are greatly dependent on the molecular weight, molecular structure, degree of branching, gelatin extraction process from collagen, natural source of collagen, temperature, pH, ionic concentration, crosslinks, reactive groups, reactive group modifications, presence of iminoacids, purity, solution concentrations, etc.

Gelatins can provide for latent heat properties as outlined in "Studies of the Cross-Linking Process in Gelatin Gels. III. Dependence of Melting Point on Concentration and Molecular Weight": Eldridge, J. E., Ferry, J. D.; Journal of Physical Chemistry, 58, 1954, pp 992-995.

Gelatin can be easily modified by reaction and crosslinking with many compounds such as crosslinkers and modifiers outlined in above detailed description. Crosslinking agents such as aldehydes where formaldehyde and glutaraldyhde may be used. Isocyanates and anhydrides may be used to both modified the properties of the gelatin and provide for reactive functional groups for bonding to substrates.

Gelatin is hydrophilic, and as such also provides both for extension of the temperature regulating capacity of the FP-PCM and for recharging of the FP-PCM. Another important feature of using gelatins and its derivatives, as well as some other hydrophilic FP-PCM is the ability to adjust its transition temperature by adjusting its moisture content and polymer structure, i.e. molecular weight.

According to one embodiment, in an article, the gelatin or modified gelatin is bound to the substrate in a covalent bond or an electrovalent bond. According to various embodiments the gelatin can be in the form of a solution which is contained within the substrate.

Figure 2:
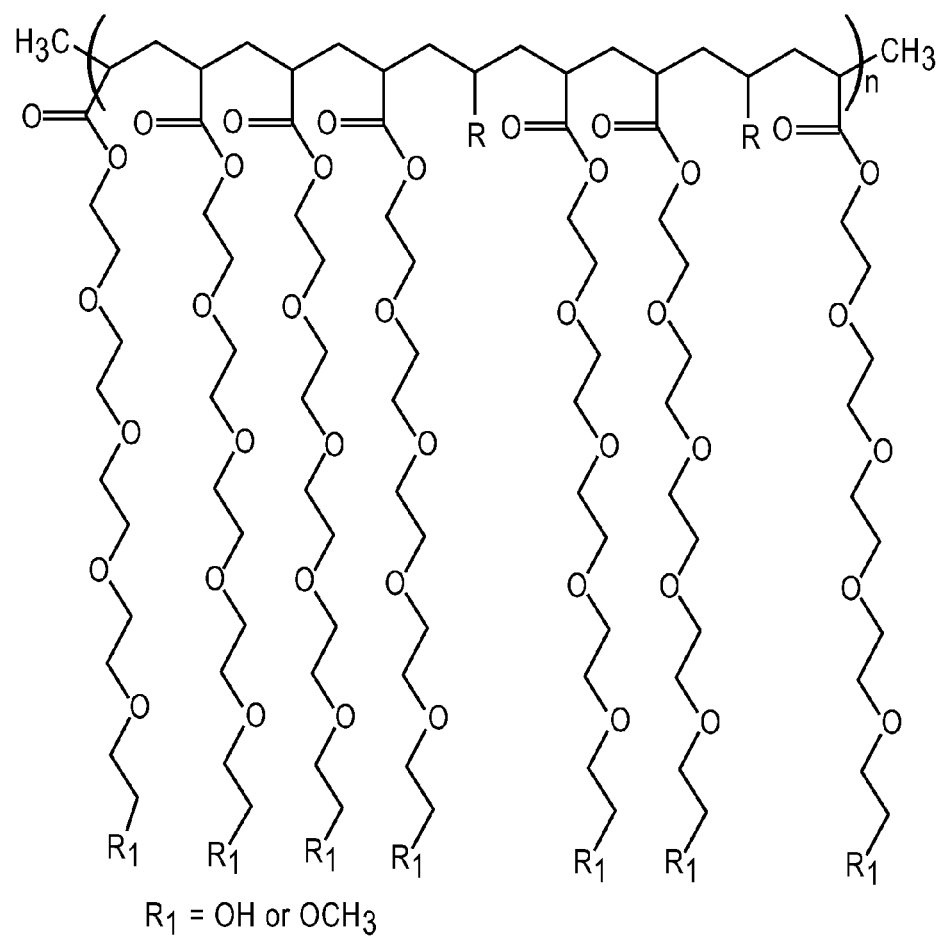

FIGS. 1 and 2 are schematic drawings of FP-PCMs used in accordance with an article constructed in accordance with various aspects of the present invention. Both are composed of a backbone chain and side chains. The FP-PCM in FIG. 1 represent long chain alkyl polyacrylate or polymethacrylate, and 1a-1c where 1a is long chain alkyl vinyl esters, 1b is long chain vinyl ethers and 1c is long chain alkyl olefins.

Figure 2A:
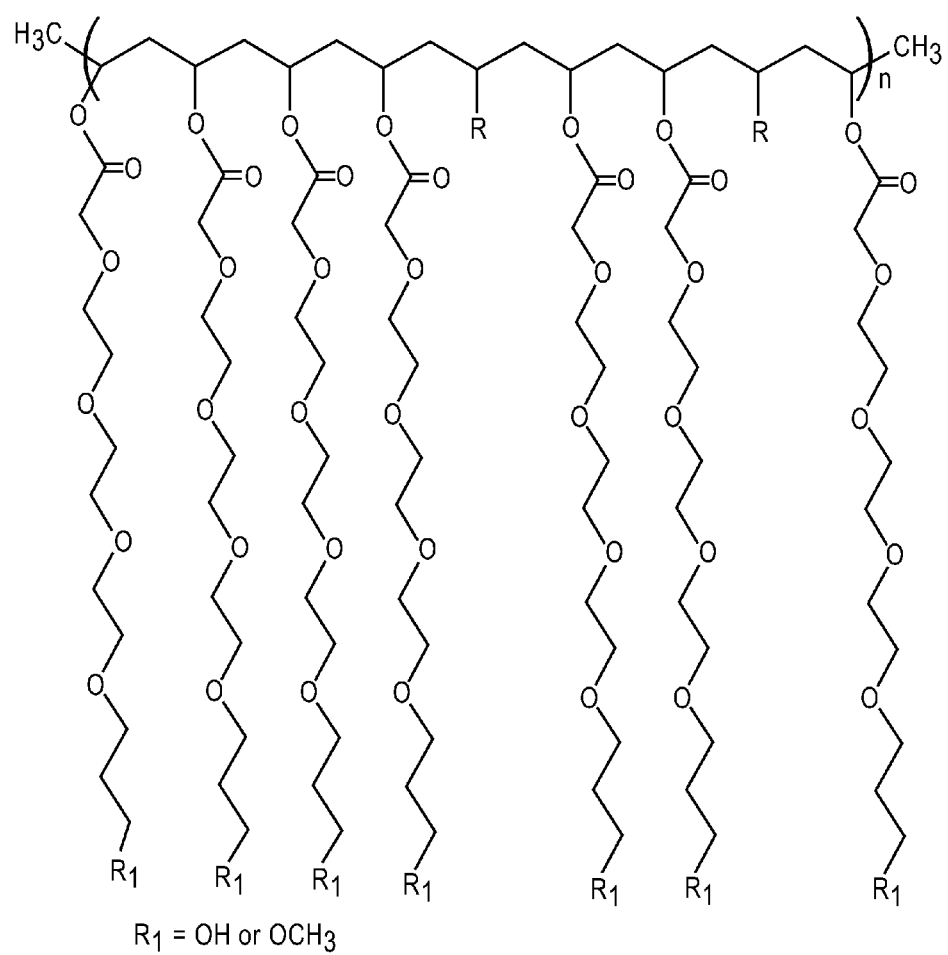
Figure 2B:
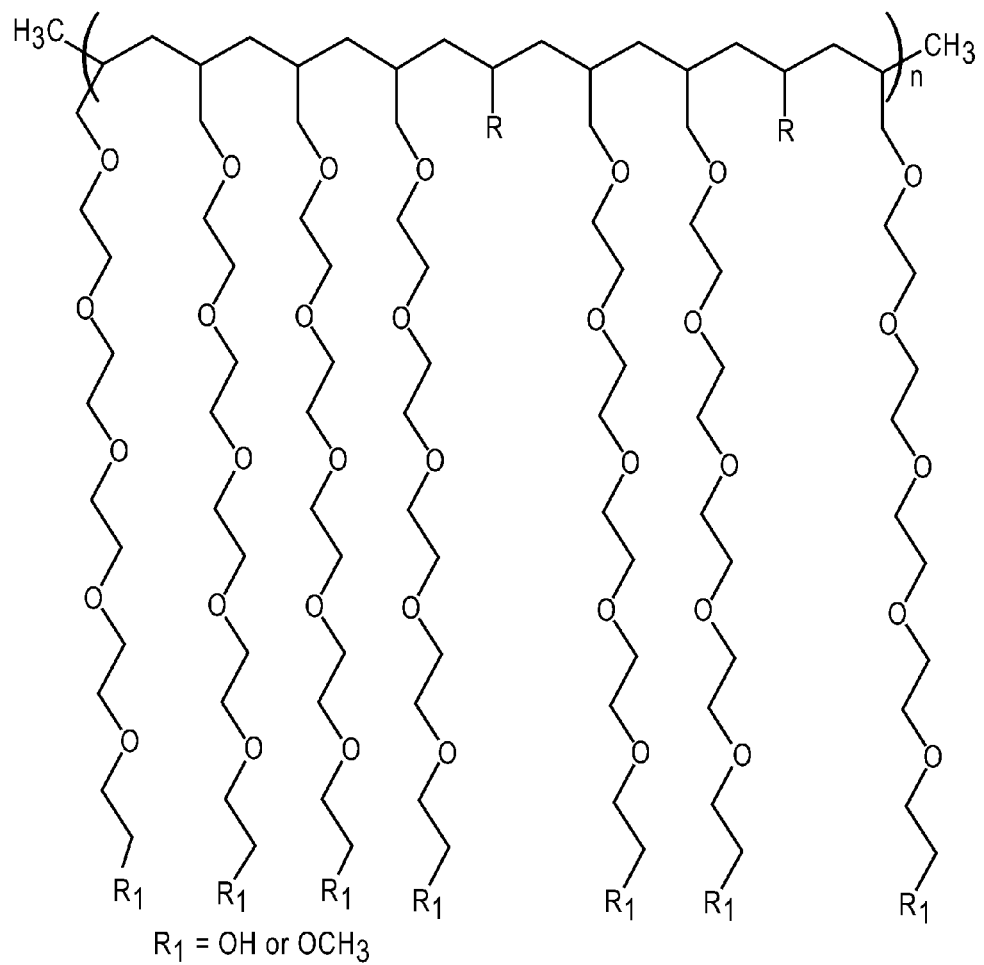

FIGS. 2a and 2b represent long chain glycol polyacrylates or polymethacrylates, where 2a is long chain glycol vinyl esters and 2b is long chain glycol vinyl ethers.

In FIGS. 1 and 2, R represents one or more of the reactive functions(s) described above. In those figures, the functions are drawn along the backbone, but that is only one option. As indicated above, the functions could also be placed at the end(s) of the backbone, on the side chains and any combination of those. Each FP-PCM may have a single or multiple reactive functions. FP-PCM may also carry multiple reactive functions of a similar chemical nature or a combination of reactive functions of different chemical nature.

Figure 5A:
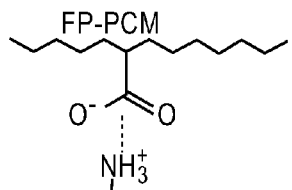
FIGS. 5A-5F are various embodiments of functional polymeric PCMs interacting with a substrate such as a construction material.
Figure 5B:
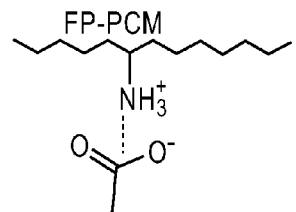
Figure 5C:
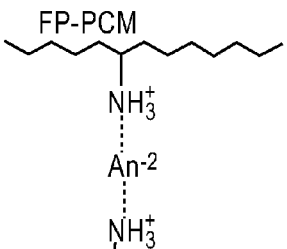
Figure 5D:
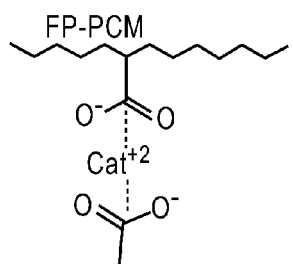
Figure 5E:
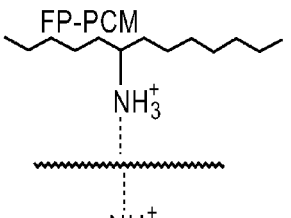
Figure 5F:
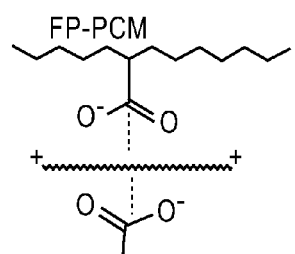

With reference to FIGS. 5A-5F, FIG. 5A drawing depicts an acidic or low pH carboxyl functional FP-PCM ionically interacting with a basic or high pH amino functional substrate. FIG. 5B depicts basic or high pH amino functional FP-PCM ionically interacting with an acidic or low pH carboxyl functional substrate. FIG. 5C depicts basic or high pH amino functional FP-PCM and a basic or high pH amino functional substrate being neutralized and ionically bound or "crosslinked" with an anion such as an amine. FIG. 5D depicts an acidic or low pH carboxyl functional FP-PCM and an acidic or low pH carboxyl functional substrate being neutralized and ionically bound or "crosslinked" with a cation such as a metal salt. FIG. 5E depicts basic or high pH amino functional FP-PCM and a basic or high pH amino functional substrate being neutralized and ionically bound or "crosslinked" with negatively charged organic compound such as dicarboxy functional polymer or dicarboxy functional FP-PCM. FIG. 5F depicts an acidic or low pH carboxyl functional FP-PCM and an acidic or low pH carboxyl functional substrate being neutralized and ionically bound or "crosslinked" with positively charged organic compound such as diamine functional polymer or diamine functional FP-PCM.

While FIGS. 5A-5F show a FP-PCM (functional) bound to the substrate, it should be understood that when used in conjunction with building materials and construction components, it is not necessary that the PCM contain a functional aspect and that non-functional PCMs may be used. Nonetheless, FIGS. 5A-5F may also represent alternative embodiments where the substrate is one or more of the building materials and construction components described above.

Figure 6A:
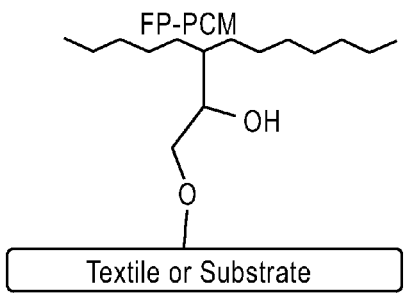
FIGS. 6A-6D are further embodiments of functional polymeric PCMs interacting with a substrate such as a construction material.
Figure 6B:
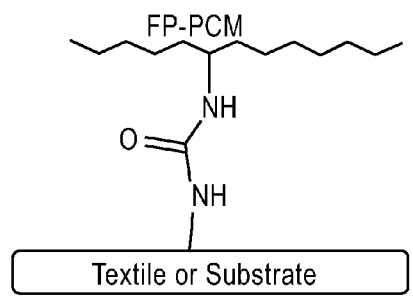
Figure 6C:
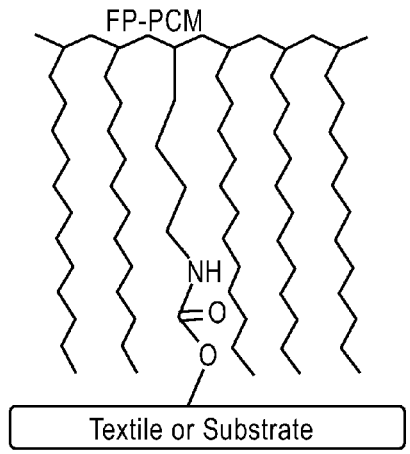
Figure 6D:
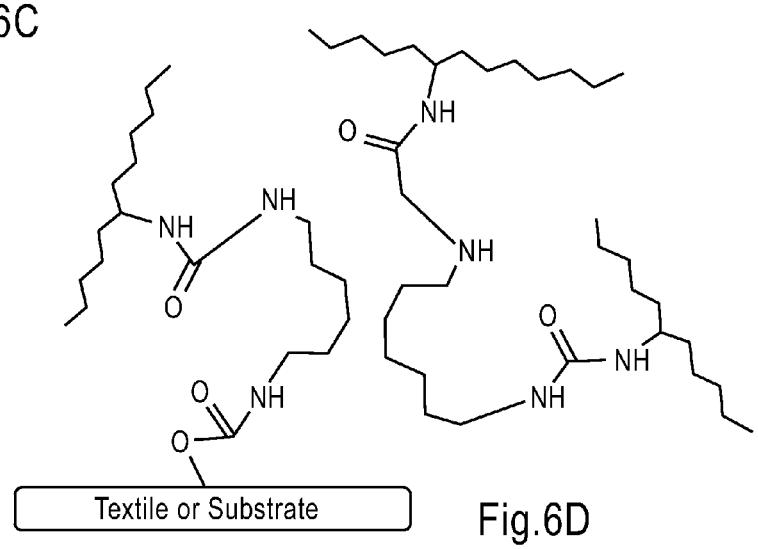

With reference to FIGS. 6A-6D, FIG. 6A depicts a covalent ether bond from the reaction of an FP-PCM epoxy and hydroxyl on a cellulose substrate. FIG. 6B depicts a covalent urea bond from the reaction of an FP-PCM isocyanate and amine from a proteinceous substrate such as wool or silk. FIG. 6C depicts a covalent urethane bond from the reaction of an FP-PCM isocyanate on the end of a side chain and hydroxyl from a cellulose substrate. FIG. 6D depicts a covalent urea and urethane bonds from the reaction of amine function, FP-PCMs, multifunctional isocyanate crosslinker/binder, and hydroxyl from a cellulose substrate.

EXAMPLES

The following examples are provided as representative of the various combinations and embodiments that may be created through the specific features described above and are not meant to be exclusive as the to scope of the claims. Furthermore, it is intended that the examples provided below not limit the completeness of the subject matter that is more appropriately captured by the full disclosure and description. It is intended that the present description serve as subject matter disclosure for any combination of the element previously disclosed.

Example 1

Preparation of Polyglycidyl Methacrylate—In a Flask Equipped with Stirrer, Condenser, Nitrogen Purge and Temperature Controller was Reacted

| | Ingredients | wt. |
|---|---|---|
| 1.) | n-pentyl propionate (Dow Chemical, Midland MI) | 37.6 |
| 2.) | Glycidyl methacrylate (Dow Chemical, Midland MI) | 85.5 |
| 3.) | Di-t-amyl peroxide (Sigma-Aldrich Corp. Milwaukee WI) | 5.4 |
| 4.) | Di-t-amyl peroxide (Sigma-Aldrich Corp. Milwaukee WI) | 0.2 |

1 was added to the flask and heated to 152° C. under nitrogen. #2 and #3 were combined and added slowly to reaction flask over 5.5 hours. This was let react and additional 0.5 hours, then #4 added, let react for 1.0 hour then cooled to yield a 69.4% solution of polyglycidyl methacrylate. This solution was dried for 4 hrs@120° C. in a forced air oven to yield 100% dried polyglycidyl methacrylate.

Example 2

Preparation of Polymeric PCM—in a Flask Equipped with Stirrer, Condenser, Nitrogen Purge and Temperature Controller was Reacted

| | Ingredients | wt. | functional eqiv. |
|---|---|---|---|
| 1.) | 95% Palmitic Acid | 36.15 | 0.141 |
| 2.) | Dried polyGMA from Ex. 1 above | 20.06 | 0.141 |

1 was added to the flask and heated to 130° C. under nitrogen. #2 was added slowly to reaction flask over 0.5 hours. This was let react and additional 3.0 hours, then cooled to yield a polymeric PCM with melt point of 38.5° C. and 63.1 J/g latent heat.

Example 3

Preparation of Polymeric PCM—in a Flask Equipped with Stirrer, Condenser, Nitrogen Purge and Temperature Controller was Reacted

| | Ingredients | wt. | functional eqiv. |
|---|---|---|---|
| 1.) | 95% Myristic Acid | 34.67 | 0.152 |
| 2.) | Dried polyGMA from Ex. 1 above | 21.60 | 0.152 |

1 was added to the flask and heated to 130° C. under nitrogen. #2 was added slowly to reaction flask over 0.5 hours. This was let react and additional 3.0 hours, then cooled to yield a polymeric PCM with melt point of 16.1° C. and 29.8 J/g latent heat.

Example 4

Preparation of Polystearyl Methacrylate Polymeric PCM

In a flask equipped with stirrer, condenser, nitrogen purge and temperature controller was reacted:

| | Ingredients | wt. |
|---|---|---|
| 1.) | n-pentyl propionate (Dow Chemical, Midland MI) | 36.1 |
| 2.) | SR324 Stearyl methacrylate (Sartomer Co., Exton PA) | 94.0 |
| 3.) | Glycidyl methacrylate (Dow Chemical, Midland MI) | 6.0 |
| 4.) | Di-t-amyl peroxide (Sigma-Aldrich Corp. Milwaukee WI) | 2.7 |
| 5.) | Di-t-amyl peroxide (Sigma-Aldrich Corp. Milwaukee WI) | 0.5 |

1 was added to the flask and heated to 152° C. under nitrogen. #2, #3 and #4 were combined and added slowly to reaction flask over 3.5 hours. This was let react and additional 1.0 hours, #5 added, let react for 1.5 hour then cooled to yield a 69.7% solution of polystearyl methacrylate-co-glycidyl methacrylate with a melt point of 31.1° C. and 83.8 J/g latent heat.

Example 5

Preparation of Wash Durable Temperature Regulating Textiles with Improved Latent Heat Content Desized, unbleached, undyed cotton fabric was treated by immersing into solutions of the polymeric PCMs with and without additional crosslinkers or fixatives. The immersed fabrics were then padded to remove excess solution dried for 4 minutes@190° C. The fabrics where rinsed with warm tap water to remove any unreacted polymer then air dried overnight and measured for latent heat content. The fabrics were then washed 5 times per AATCC 143.

| Ingredients | #1 | #2 | #3 |
|---|---|---|---|
| | Weight (grams) | | |
| Polymeric PCM Ex. 2 | 5.13 | 5.25 | |
| Cymel 385 (Cytec Industries, Inc., West Patterson, NJ) | 1.04 | | |

-continued

| Ingredients | #1 | #2 | #3 |
|---|---|---|---|
| | Weight (grams) | | |
| Bayhydur VPLS 2306 (Bayer Polymers, Pittsburgh PA) | | 1.18 | |
| Acetone | 10.68 | 11.79 | |
| Polymeric PCM Ex. 4 | | | 30.0 |
| Wash Durability and Latent Heat Content (J/g) | | | |
| Treated Fabric | 8.1 | 14.5 | 37.3 |
| 5x Washes | 5.8 | 12.0 | 31.2 |

Example 6

Various polymeric PCMs were made similar to example 4 above, but the mol. wt. was varied by changing the amount of peroxide initiator or changing the polymerization solution solids.

Example 6

Polymeric PCM Molecular Weight Results

| Sample | DSC | J/g | Melt Peak | Mn | Mw | Mz | Pd |
|---|---|---|---|---|---|---|---|
| 4-123, mfg at 70% solids | Good | 83.8 | 31.1 | 2670 | 8040 | 14600 | 3.01 |
| 4-135, mfg at 75% solids | Acceptable | 73.5 | 33.5 | 4170 | 21400 | 50400 | 5.13 |
| 4-144, mfg at 100% solids | Poor | 63.6 | 26.2 | 4680 | 39200 | 232400 | 8.38 |

Example 7

Above polymeric PCM, 4-123, was dried to 100% solids then added to various polymer fiber solutions both in the lab and in production pilot plant. These solutions were either spun into fiber or cast into films, coagulated, and dried to yield polymeric PCM modified products. Solution A consisted of Acordis Itaconic acid func. CFP polyacrylonitrile polymer dissolved in 1:1 NaSCN:H$_2$O to give a 10% final solution. Solution B consisted of Novaceta® diacetate dissolved in water:acetone mixture to give a 26.6% solids solution in a wt. ratio of cellulose diacetate/H$_2$O/Acetone, 26.6/3.9/69.5. Solution C was based on Novaceta pilot run using polymeric PCM produced at Ortec Inc.

Example 7

Fiber and Films

| Sample | % FP-PCM | Theory J/g | Measured J/g | Thermocycle and C$_6$ Extr. | % <Theory |
|---|---|---|---|---|---|
| Sol. A | 15.0 | 12.6 | 8.0 | | |
| Sol. B | 10.0 | 8.4 | 4.6 | 5.9 | 30 |
| Sol. C | 10.0 | 7.1 | 2.4 | 2.9 | 59 |

Example 8

Polymeric PCM and Functional Polymeric PCM Incorporated Into Cellulose Insulation Material Chopped newspaper cellulose for blown insulation manufactured by GreenFiber LLC was purchased from Home Depot Inc. Melted P-PCM and FP-PCM was sprayed on the samples and let cool to create cellulose insulation with increased latent heat content and thermal mass. The samples were tested for thermal properties, compaction and PCM migration. Thermal results were analyzed by DSC. Compaction was measured by filling a graduated cylinder to 100 ml with equal weights, then submitting the cylinders for 50 cycles from 10-60° C. and analyzing the reduction in volume. Migration was tested by putting the treated cellulose in contact with brown kraft paper, submitting to the same 50 temperature cycles and looking for oil/grease transfer to the kraft paper. The migration was then rated from 1-10 with 1 being significant migration 10 no migration. Dusting was evaluated by putting 30 grams of cellulose sample in a clear plastic bag, filled with air then shaken and visually evaluated for dust inside the bag.

Results of the testing is reflected in the table below.

| PCM Type | % PCM | J/g | Dusting | Migration | Compaction |
|---|---|---|---|---|---|
| Control | 0 | 0 | Significant amounts | 10 | 100 ml |
| Polyolefin P-PCM | 40 | 27 | None to low | 6 | 100 ml |
| Polyolefin P-PCM | 20 | 20 | Low | 5 | 100 ml |
| Polyacrylate FP-PCM | 40 | 29 | None | 5 | 100 ml |
| Polysilicone FP-PCM | 40 | 28 | None | 4 | 100 ml |
| Octadecane, C18 | 20 | 35 | None to low | 1 | 98 ml, 2 ml compaction |

To further improve the migration properties, 2% by weight crosslinker was added to react with the FP-PCMs and further fix them to the insulation material.

| PCM Type | % Crosslinker | % PCM | J/g | Dusting | Migration |
|---|---|---|---|---|---|
| Control | 0 | 0 | 0 | Significant amounts | 10 |
| Polyacrylate FP-PCM | 2 | 20 | 26 | None to low | 8 |
| Polyacrylate FP-PCM | 2 | 40 | 25 | None | 7 |
| Polysilicone FP-PCM | 2 | 20 | 29 | None | 10 |
| Polysilicone FP-PCM | 2 | 40 | 27 | None | 9 |

As shown in the first table, the addition of P-PCM or FP-PCM adds latent heat and temperature regulating properties, greatly reduces dusting, and improves the migration over standard unencapsulated PCM (Octadecane) without significantly affecting compaction/loft. To prevent leakage and improve migration, a crosslinker was added to react with the functional groups of the FP-PCM and fix the FP-PCM onto the insulation and substrate. This yielded greatly improved migration results without significantly reducing or affecting the latent heat properties thereby creating a low dusting, latent heat containing temperature regulation insulation without PCM migration or leakage.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A material for energy management and peak energy reduction in a building structure, comprising:
   a foam base material
   a fire resistant material;
   a first phase change material, the first phase change material disposed within a containment structure and dispersed within the foam base material; and
   a functional polymeric phase change material dispersed within the foam base material that dynamically absorbs and releases heat to adjust heat transfer at or within a temperature range and having at least one phase change temperature in the range between −10° C. and 100° C. and a phase change enthalpy of at least 5 Joules per gram, the functional polymeric phase change material being hydrophobic,
   the functional polymeric phase change material including a plurality of polymer chains, the plurality of polymer chains including a backbone chain and a plurality of side chains, wherein a first portion of the plurality of polymer chains are crosslinked to each other, wherein a second portion of the plurality of polymer chains are crosslinked with the containment structure.

2. A material for energy management and peak energy reduction in a building structure according to claim 1, wherein the first portion of the plurality of side chains and the second portion of the plurality of side chains are crosslinked via one of covalent bonding or electrovalent bonding.

3. A material for energy management and peak energy reduction in a building structure according to claim 1, wherein the first portion of the plurality of side chains and the second portion of the plurality of side chains are crosslinked via direct bonding.

4. A material for energy management and peak energy reduction in a building structure according to claim 3, wherein the bonding is accomplished by a connecting compound.

5. A material for energy management and peak energy reduction in a building structure according to claim 2 further comprising at least one ingredient selected from a group consisting of a binder, a formulation, an additive, crosslinkers, blending polymers, compatibilizers, wetting agents, and combinations of the foregoing.

6. A material for energy management and peak energy reduction in a building structure according to claim 2, wherein the foam base material is selected from the group consisting of open cell foam and closed cell foam.

7. A material for energy management and peak energy reduction in a building structure according to claim 2, wherein the functional polymeric phase change material is selected from the group consisting of an acid anhydride group, an alkenyl group, an alkynyl group, an alkyl group, an aldehyde group, an amide group, an amino group and their salts, a N-substituted amino group, an aziridine, an aryl group, a carbonyl group, a carboxy group and their salts, an epoxy group, an ester group, an ether group, a glycidyl group, a halo group, a hydride group, a hydroxy group, an isocyanate group, a thiol group, a disulfide group, a silyl or silane group, an urea group, and an urethane group, and wherein the foam base material comprises at least one of cellulose, metal, wood, plastic, and glass.

8. A material for energy management and peak energy reduction in a building structure according to claim 2, wherein the functional polymeric phase change material comprises a double bond.

9. A material for energy management and peak energy reduction in a building structure according to claim 2, characterized in having phase change enthalpy of at least 2.0 Joules per gram.

10. A material for energy management and peak energy reduction in a building structure according to claim 2, wherein the functional polymeric phase change material comprises a hydrophilic crystallizable section.

11. A material for energy management and peak energy reduction in a building structure thermally regulating building construction material according to claim 2, wherein the functional polymeric phase change material comprises a hydrophobic crystallizable section.

12. A building construction material for energy management and peak energy reduction, comprising:
   a foam base material;
   a first phase change material, the first phase change material disposed within a containment structure and dispersed on the surface of the foam base material; and
   a functional polymeric phase change material dispersed within the foam base material that dynamically absorbs and releases heat to adjust heat transfer at or within a temperature range and having at least one phase change temperature in the range between −10° C. and 100° C. and a phase change enthalpy of at least 5 Joules per gram,
   the functional polymeric phase change material including a plurality of polymer chains, the plurality of polymer chains including a backbone chain, wherein a first portion of the plurality of polymer chains are crosslinked to each other, wherein a second portion of the plurality of polymer chains are crosslinked with the containment structure.

13. The building construction material for energy management and peak energy reduction of claim 12, wherein the building construction material is selected from the group consisting of insulation, metal sheeting, glass, siding, particle board, flashing.

14. The building construction material for energy management and peak energy reduction of claim 12, wherein the building construction material further comprises an additive selected from the group consisting of an anti-microbial, an anti-fungal, a U/V blocker, and a moisture management material.

15. An insulation material for use in building construction, comprising:
   a foam base material;
   a particulate contained functional polymeric phase change material dispersed within or on the surface of the foam base material;
   the functional polymeric phase change material dispersed within and bound to the foam base material, the functional polymeric phase change material dynamically absorbing and releasing heat to adjust heat transfer at or within a temperature range and having at least one phase change temperature in the range between −10° C. and 100° C. and a phase change enthalpy of at least 5 Joules per gram, the functional polymeric phase change material including a plurality of polymer chains, the plurality of polymer chains including a backbone chain.

16. The insulation material for use in building construction of claim 15, further comprising a second portion of the plurality of polymer chains that are crosslinked via a covalent or electrovalent bond.

17. The insulation material for use in building construction of claim 15, wherein the particulate-based containment structure is selected from the group consisting of silica, zeolites, and carbon.

18. The building construction material for energy management and peak energy reduction of claim 15 further comprising a fire resistant material.

* * * * *